United States Patent
Yamamoto

(10) Patent No.: US 9,751,489 B2
(45) Date of Patent: Sep. 5, 2017

(54) CLIP, AND PILLAR GARNISH FIXING STRUCTURE

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (KR)

( * ) Notice: Subject to any disclaimer, the term of this patent is extended or adjusted under 35 U.S.C. 154(b) by 0 days.

(21) Appl. No.: 15/038,909

(22) PCT Filed: Nov. 18, 2014

(86) PCT No.: PCT/JP2014/080418
§ 371 (c)(1),
(2) Date: May 24, 2016

(87) PCT Pub. No.: WO2015/079959
PCT Pub. Date: Jun. 4, 2015

(65) Prior Publication Data
US 2016/0375852 A1 Dec. 29, 2016

(30) Foreign Application Priority Data

Nov. 29, 2013 (JP) .................................. 2013-246908
Jun. 25, 2014 (JP) .................................. 2014-130184

(51) Int. Cl.
*B60R 21/216* (2011.01)
*B60R 21/213* (2011.01)
(Continued)

(52) U.S. Cl.
CPC .......... *B60R 21/216* (2013.01); *B60R 21/213* (2013.01); *F16B 21/082* (2013.01);
(Continued)

(58) Field of Classification Search
CPC ................ B60R 21/216; B60R 21/213; B60R 2021/2161; B60R 2021/21518;
(Continued)

(56) References Cited

U.S. PATENT DOCUMENTS 9,115,743 B2 * 8/2015 Yamamoto ............ F16B 21/065
9,283,902 B2 * 3/2016 Yamamoto .......... B60R 13/0206
(Continued)

FOREIGN PATENT DOCUMENTS

JP     S55-076906 U     5/1980
JP     H03-121604 U    12/1991
(Continued)

*Primary Examiner* — Robert J Sandy
(74) *Attorney, Agent, or Firm* — Oliff PLC

(57) ABSTRACT

A clip and a tether clip of a pillar garnish fixing structure includes a shaft and a pair of engagement hooks opposing each other. Each engagement hook is connected to the shaft at a hook connecting portion. A deformation promoting portion is formed at each of a pair of shaft wall portions opposing each other in a diametrical direction perpendicular to a direction in which the pair of engagement hooks are opposed. Even when a thickness of the hook connecting portion is increased thereby increasing a strength of the engagement hook, the hook connecting portion is deformed so as to approach a center axis line so that the engagement hook can pass through a clip fixing aperture. As a result, both the strength of the engagement hook and a serviceability can be satisfied.

7 Claims, 21 Drawing Sheets

(51) Int. Cl.
*F16B 21/08* (2006.01)
*B60R 21/215* (2011.01)
*F16B 5/06* (2006.01)

(52) U.S. Cl.
CPC .... *F16B 21/086* (2013.01); *B60R 2021/2161* (2013.01); *B60R 2021/2163* (2013.01); *B60R 2021/21518* (2013.01); *F16B 5/065* (2013.01); *Y10T 24/309* (2015.01); *Y10T 24/45105* (2015.01)

(58) Field of Classification Search
CPC ............. B60R 2021/2163; F16B 19/00; Y10T 24/309; Y10T 24/45105
See application file for complete search history.

(56) References Cited

U.S. PATENT DOCUMENTS

| | | |
|---|---|---|
| 9,316,242 B2 * | 4/2016 | Aoshima ............... F16B 19/004 |
| 2005/0052001 A1 | 3/2005 | Totani et al. |
| 2006/0066080 A1 | 3/2006 | Ikeda et al. |
| 2008/0008560 A1 | 1/2008 | Wakabayashi et al. |
| 2013/0168515 A1 * | 7/2013 | Yamamoto .......... B60R 13/0206 248/231.81 |
| 2014/0319808 A1 | 10/2014 | Yamamoto |

FOREIGN PATENT DOCUMENTS

| | | |
|---|---|---|
| JP | 2005-075321 A | 3/2005 |
| JP | 2006-088985 A | 4/2006 |
| JP | 2008-032205 A | 2/2008 |
| JP | 2013-113419 A | 6/2013 |
| JP | 2013-180725 A | 9/2013 |
| WO | 2013/179110 A1 | 12/2013 |

* cited by examiner

[FIG.1]
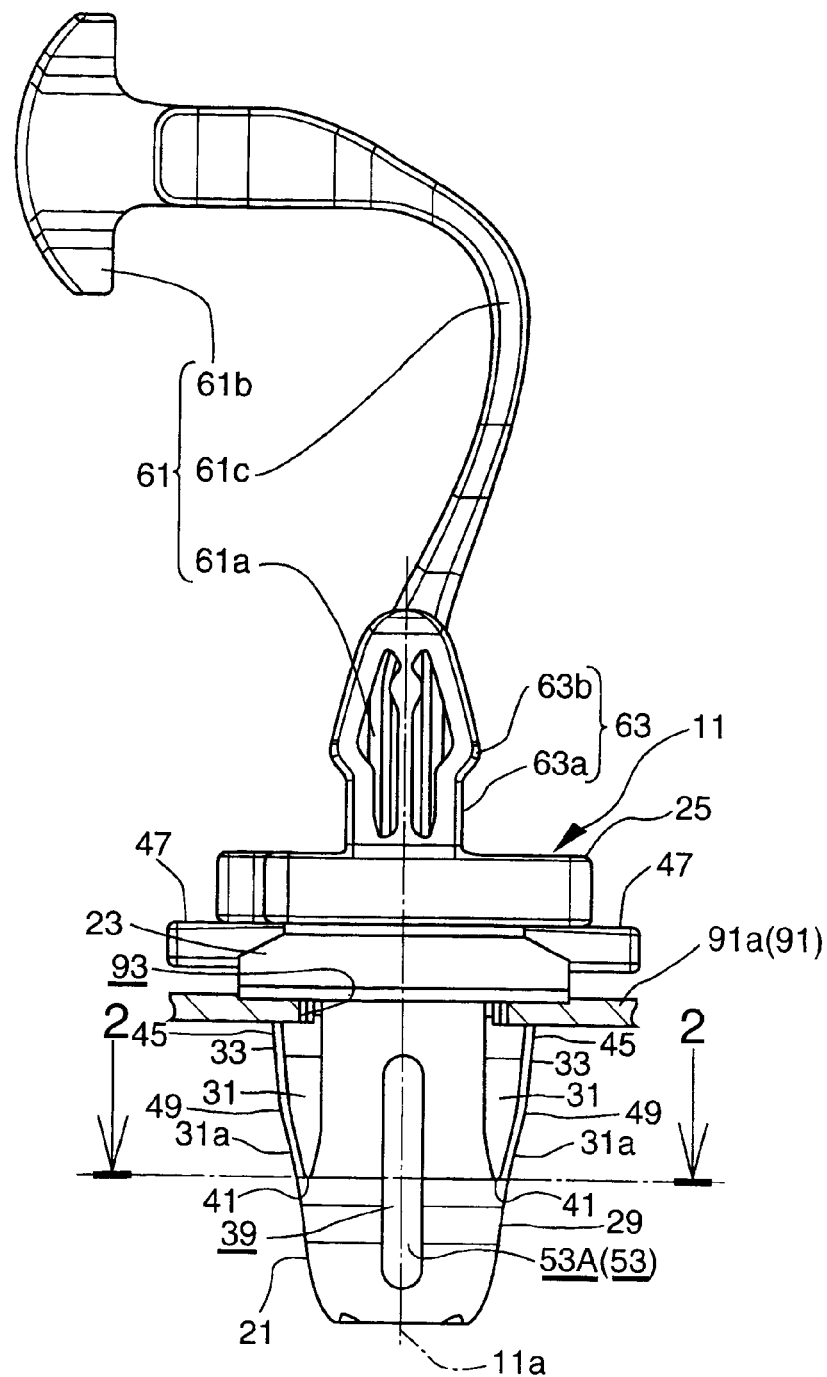

[FIG.2]
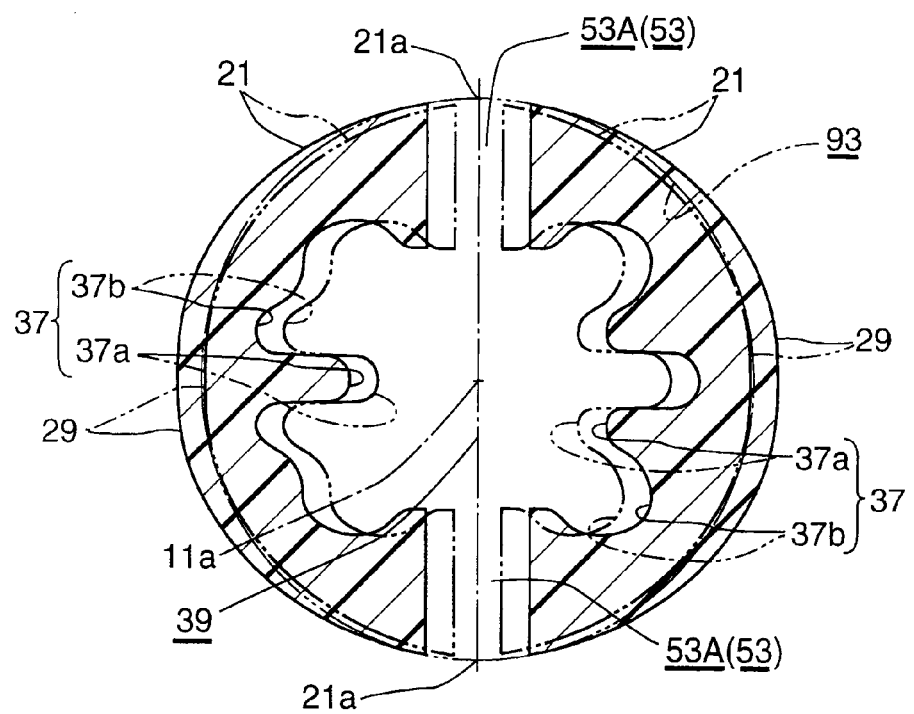

[FIG.3]
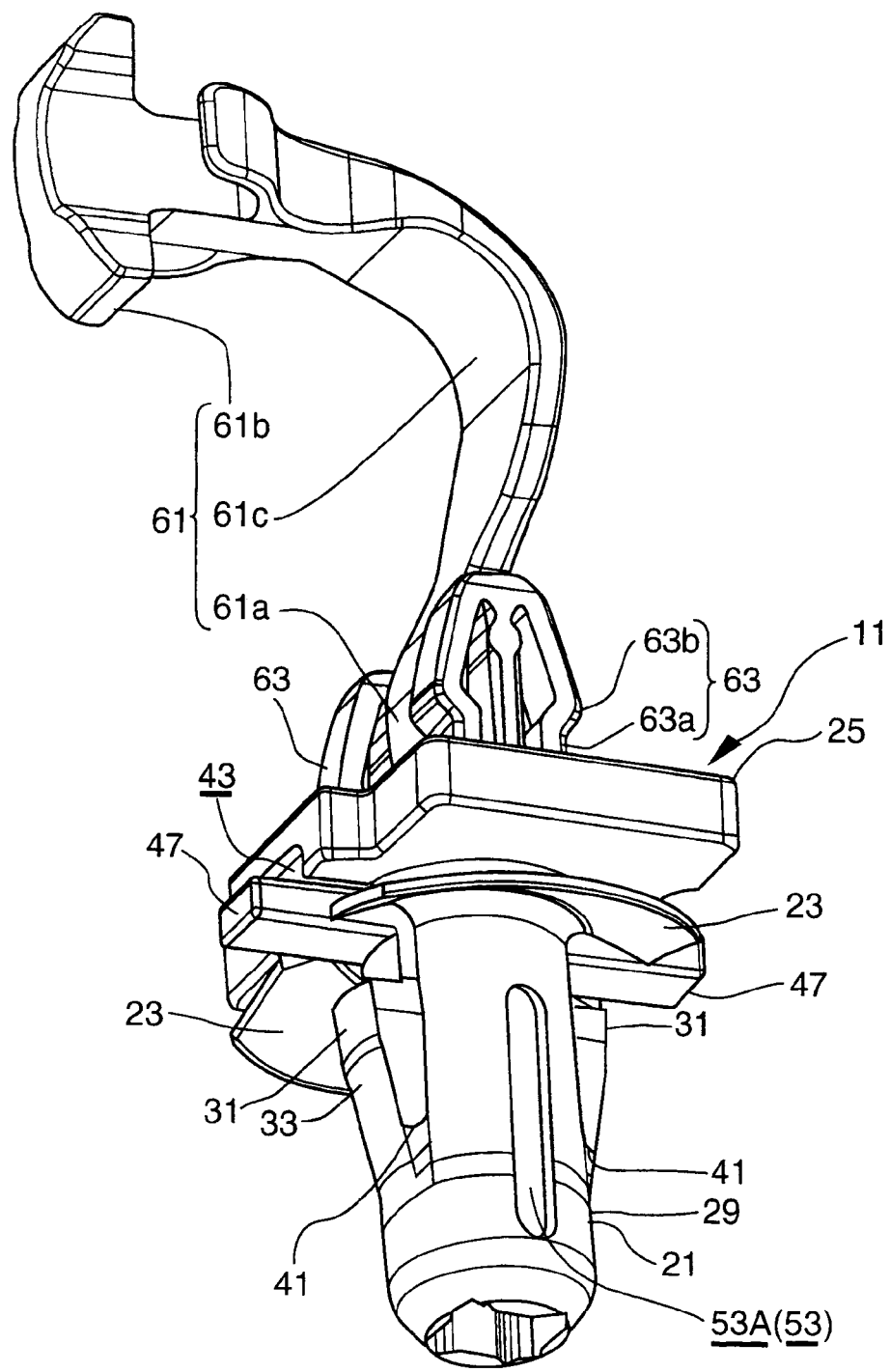

[FIG.4]
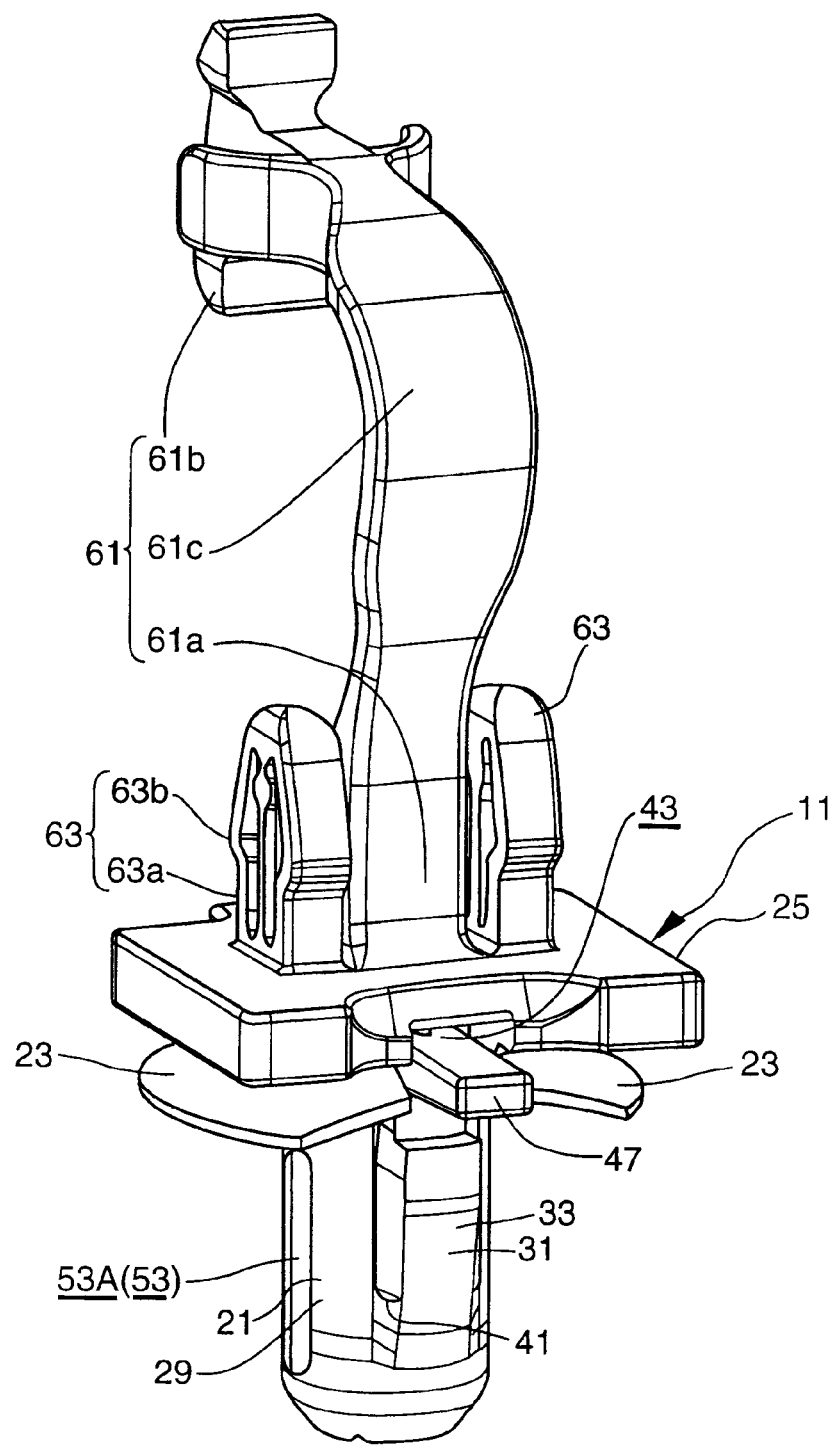

[FIG.5]
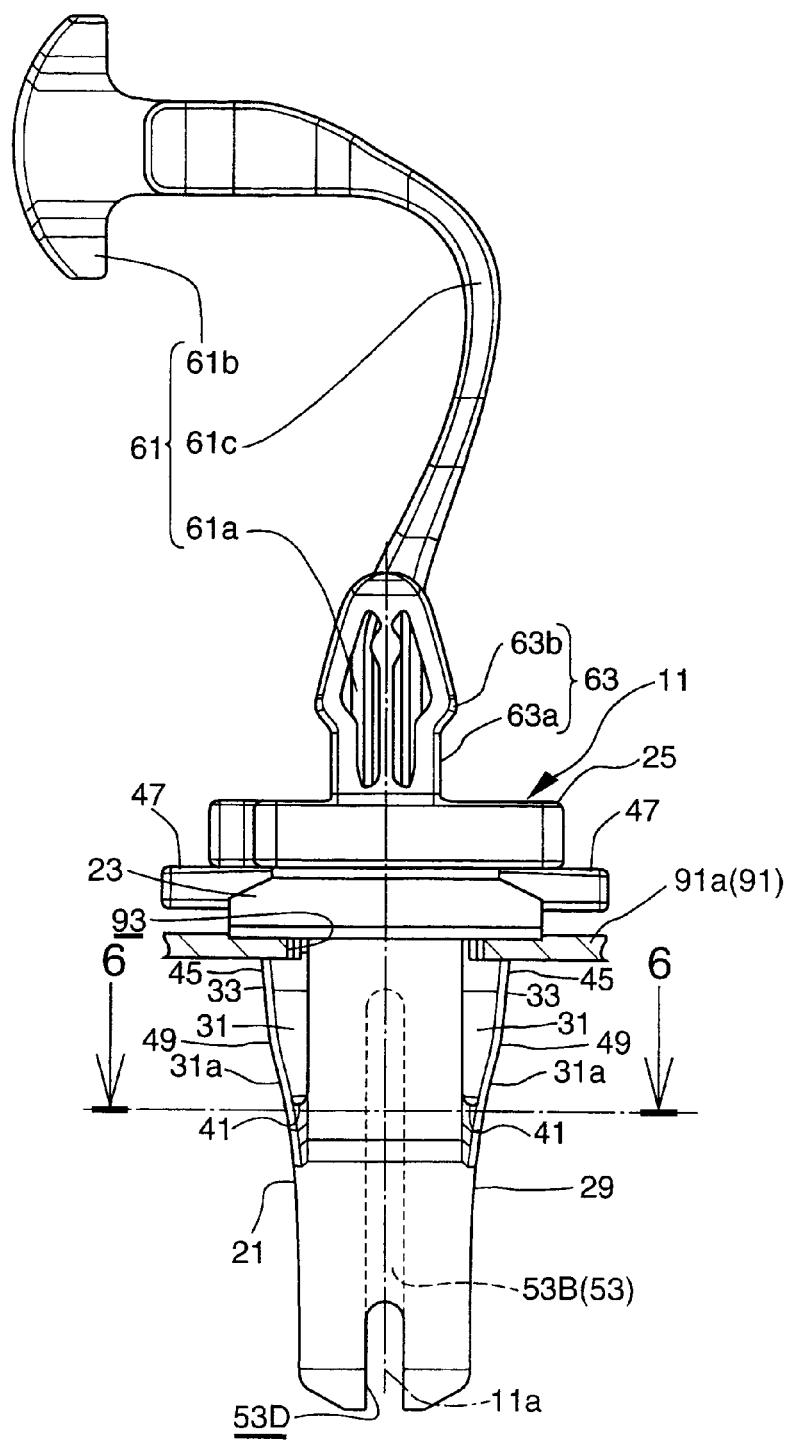

[FIG.6]
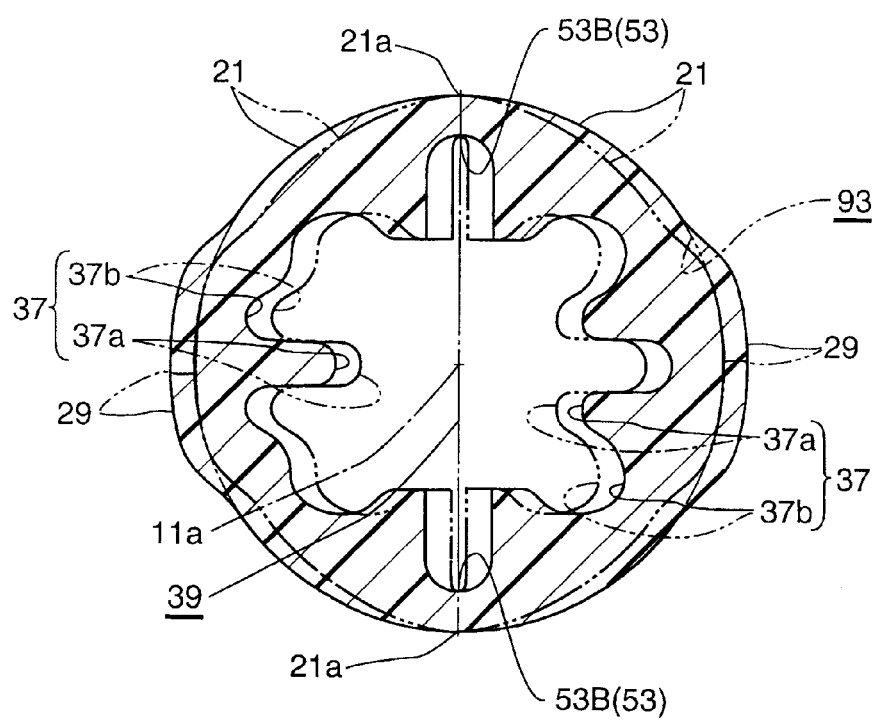

[FIG.7]
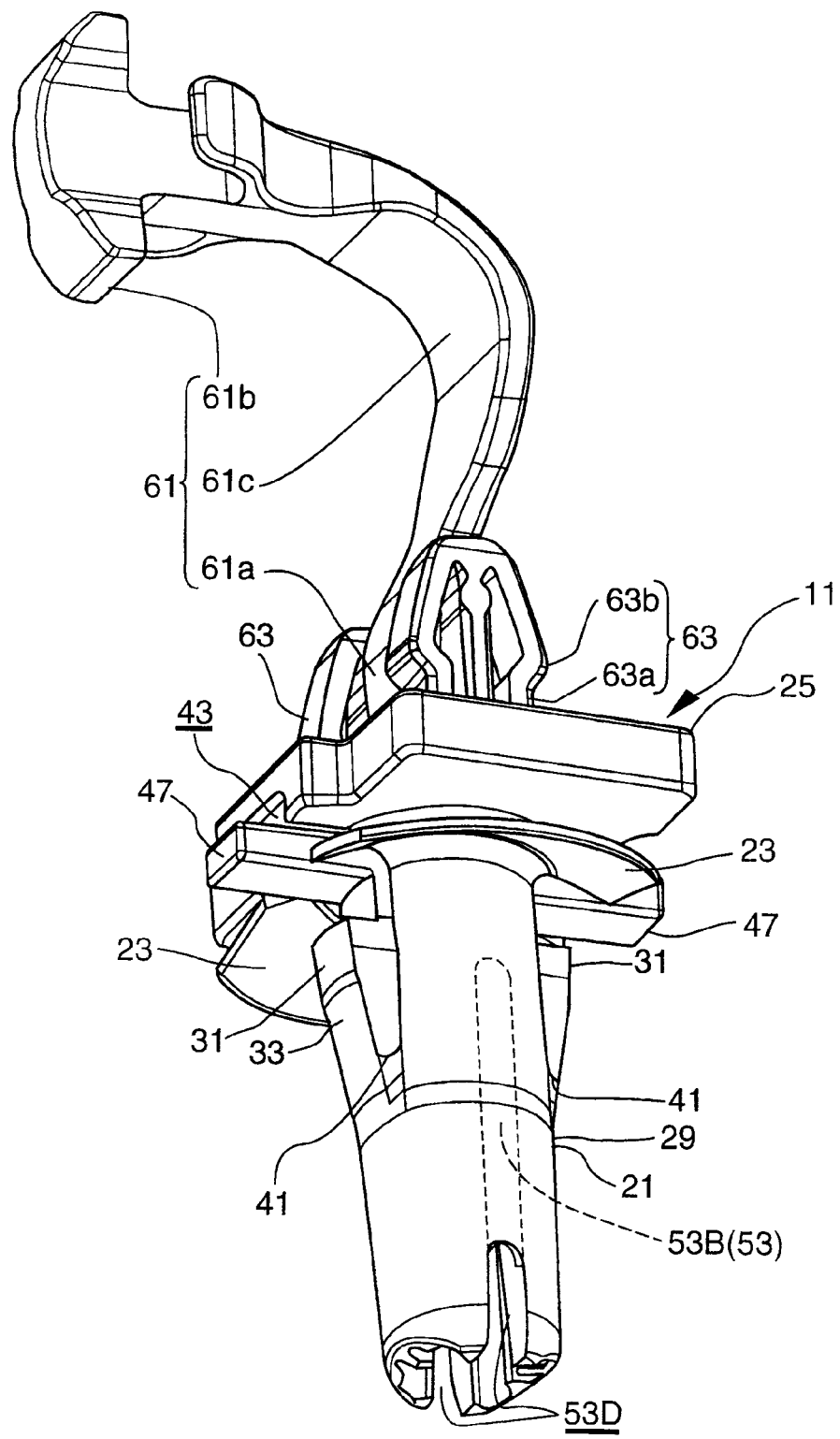

[FIG.8]
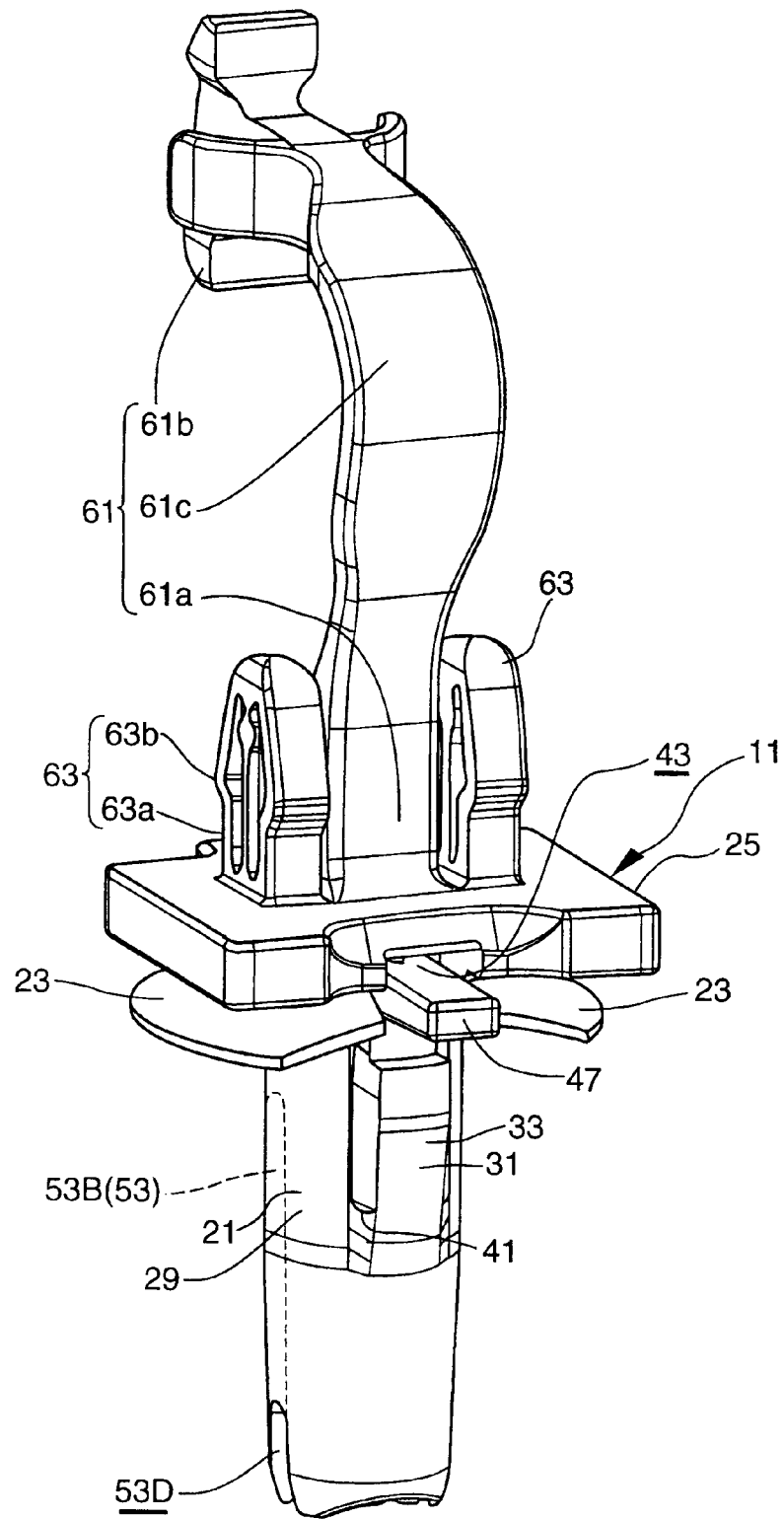

[FIG.9]
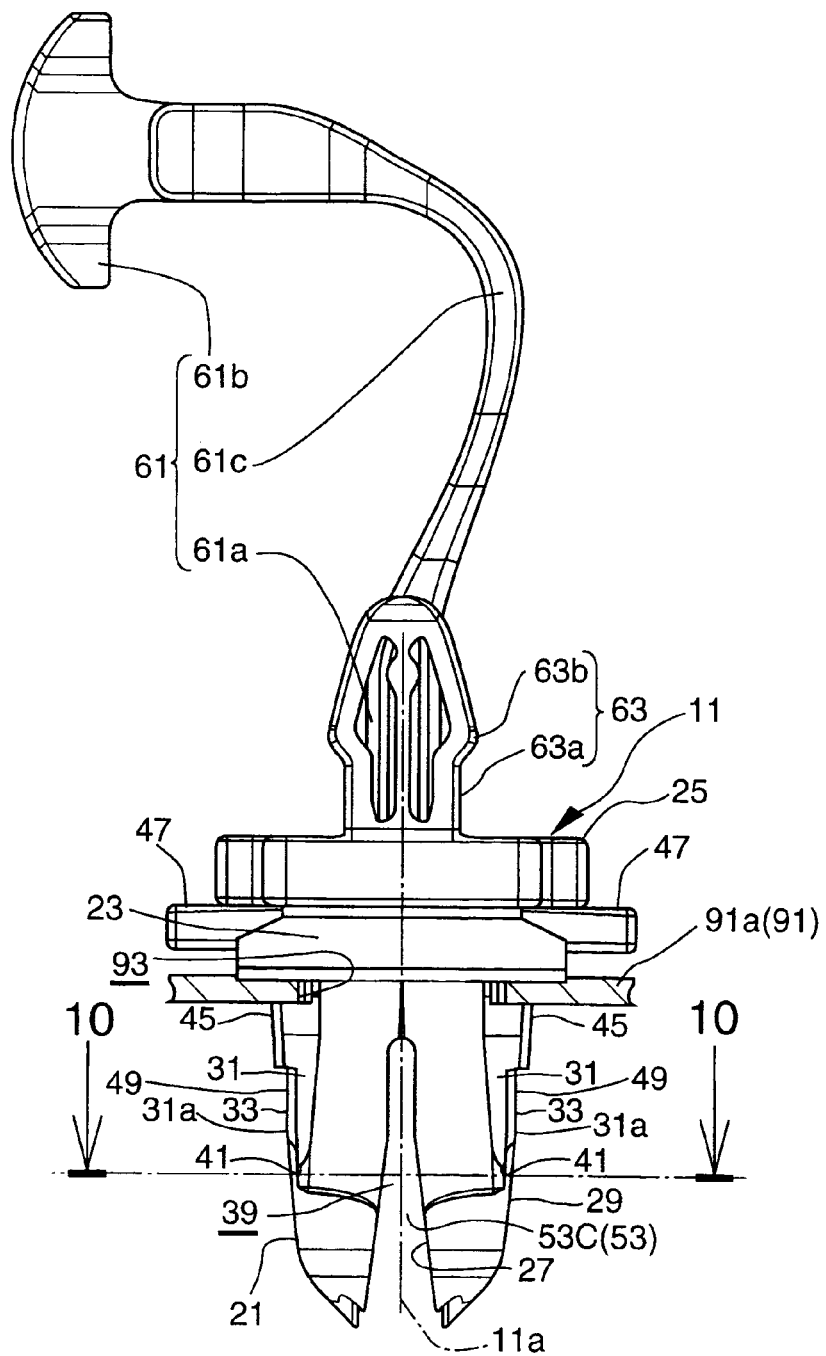

[FIG.10]
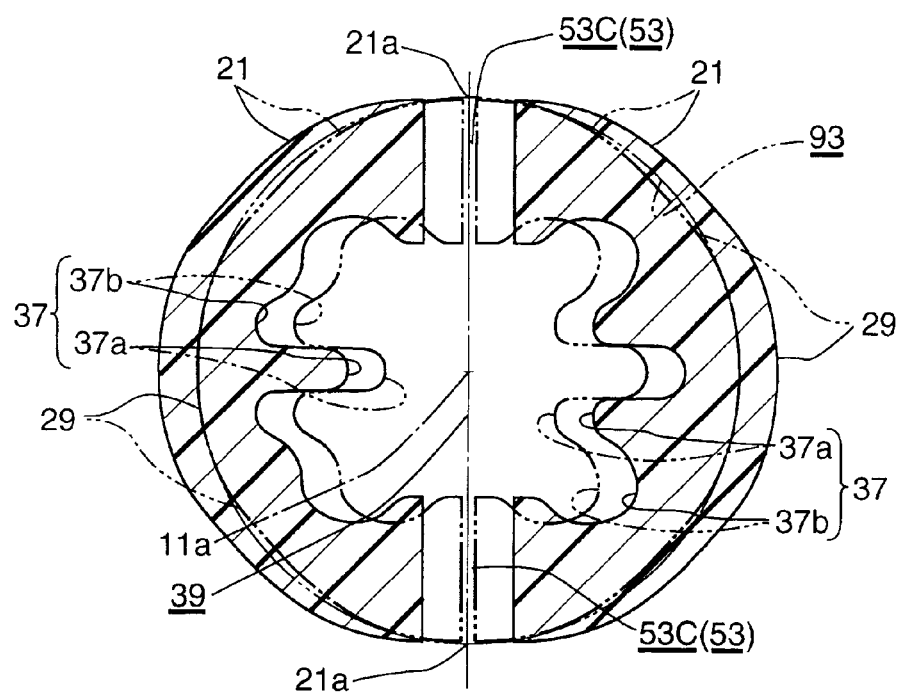

[FIG.11]
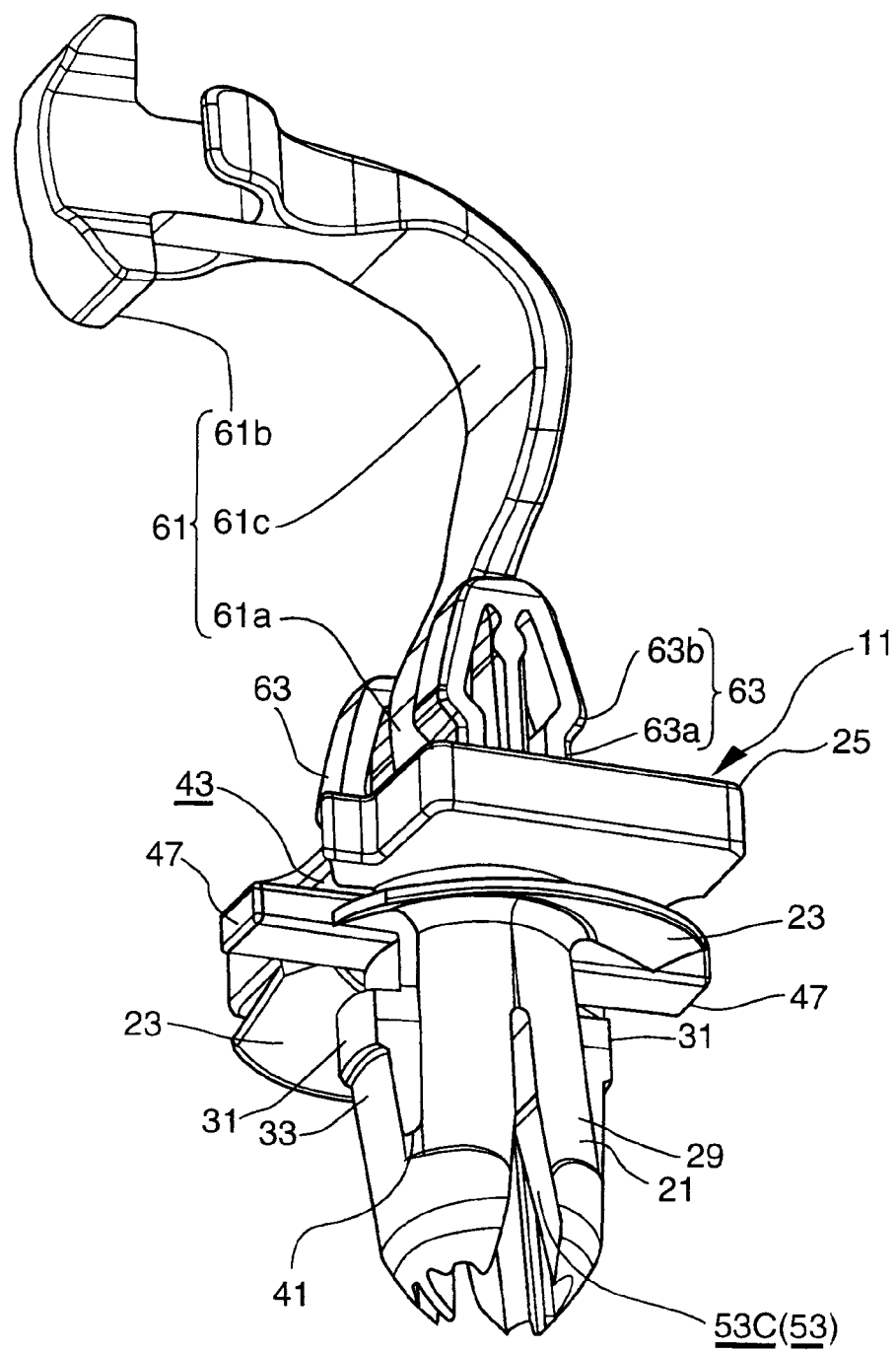

[FIG.12]
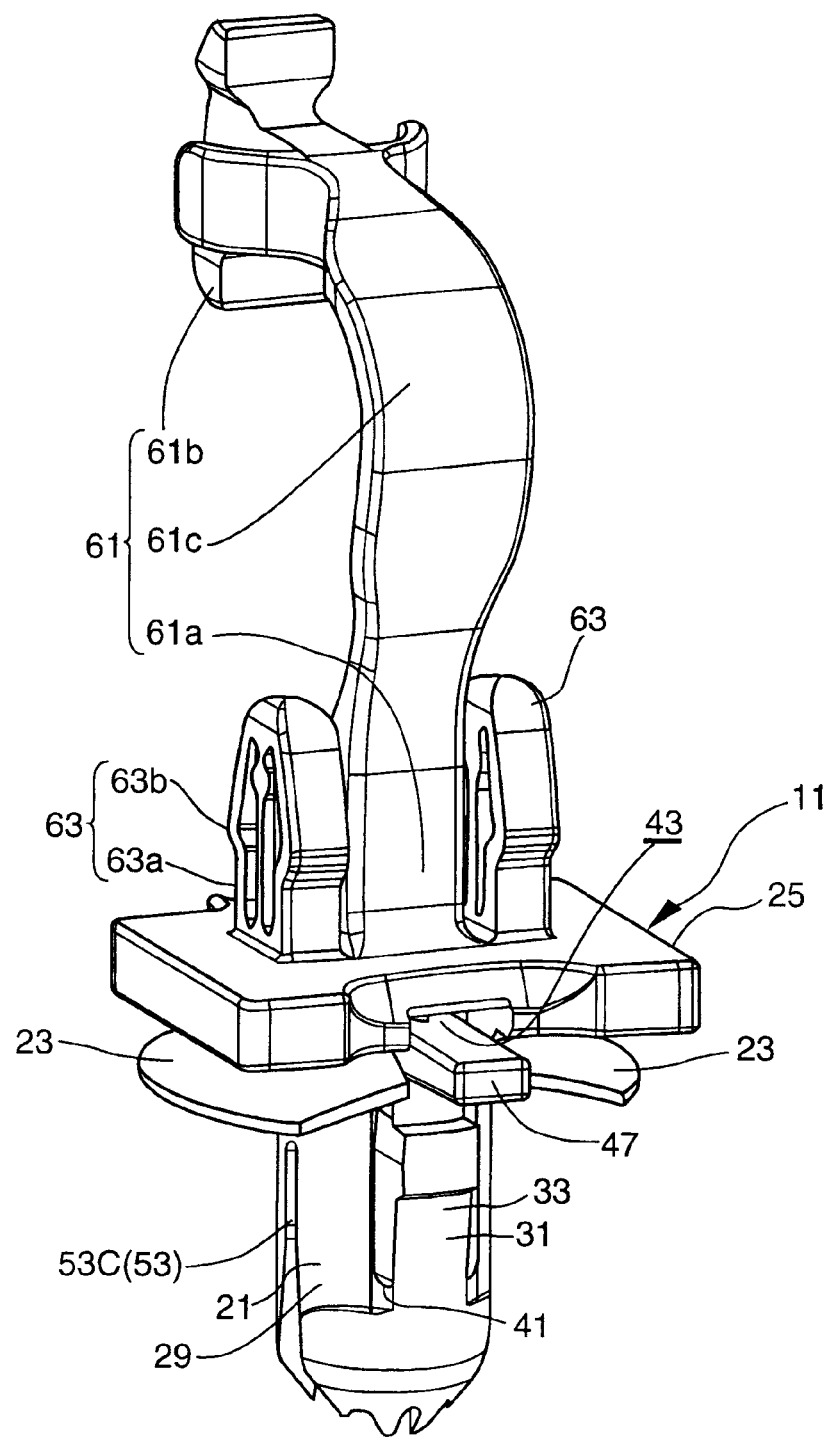

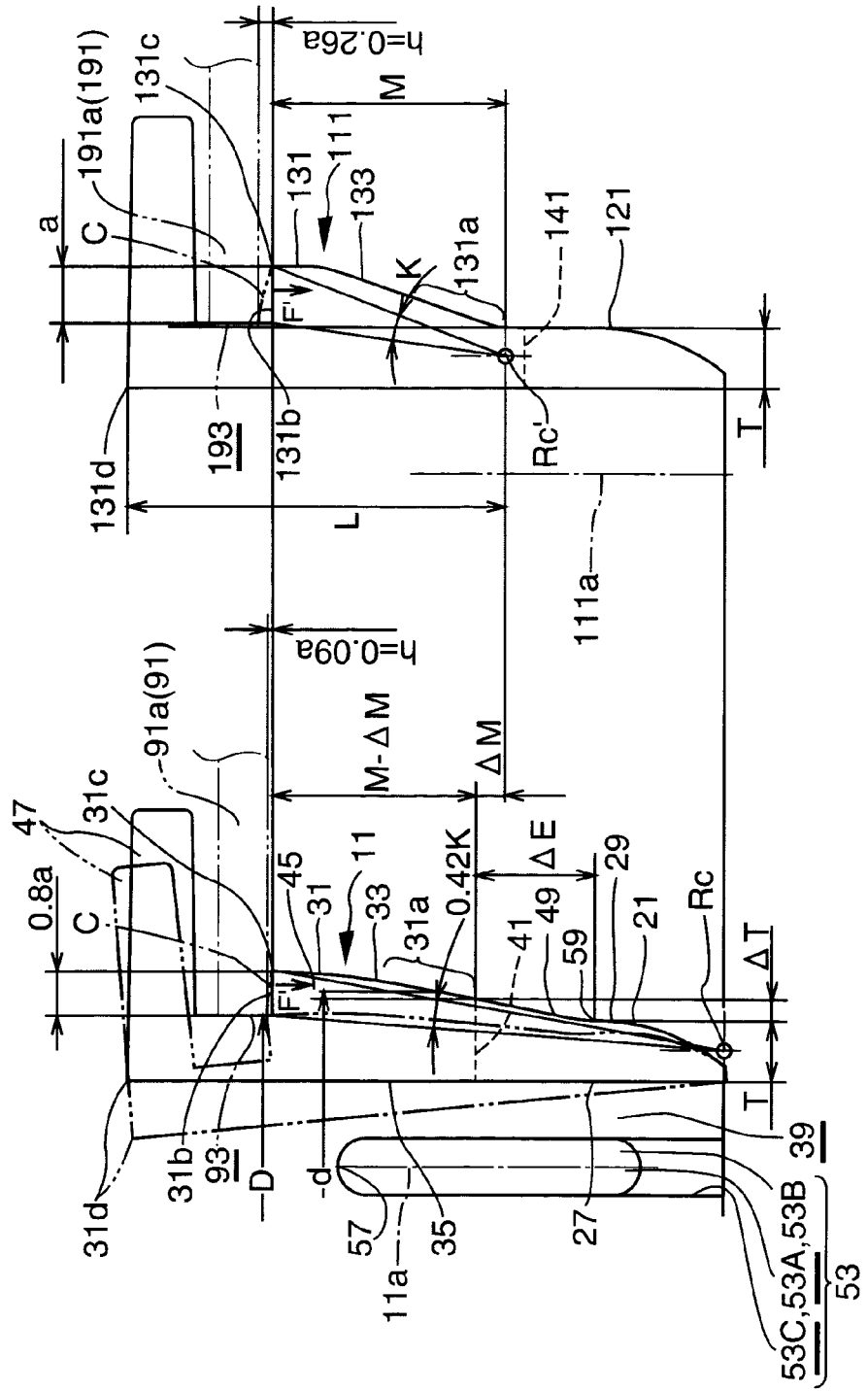
[FIG.13]

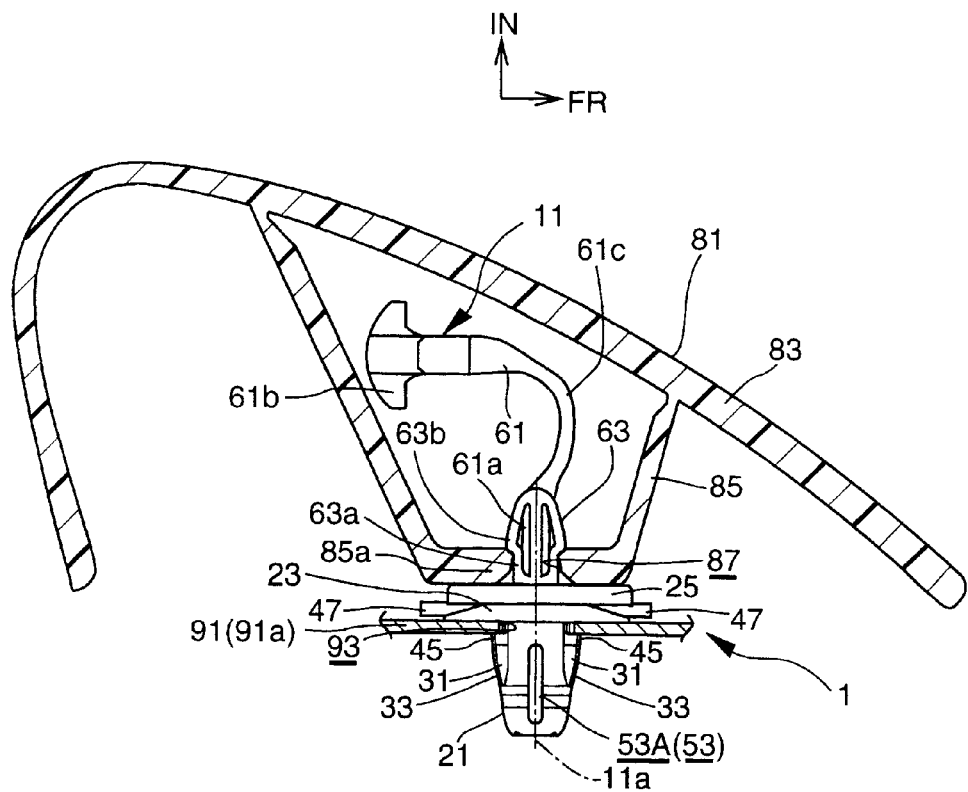
[FIG.14]

[FIG.15]
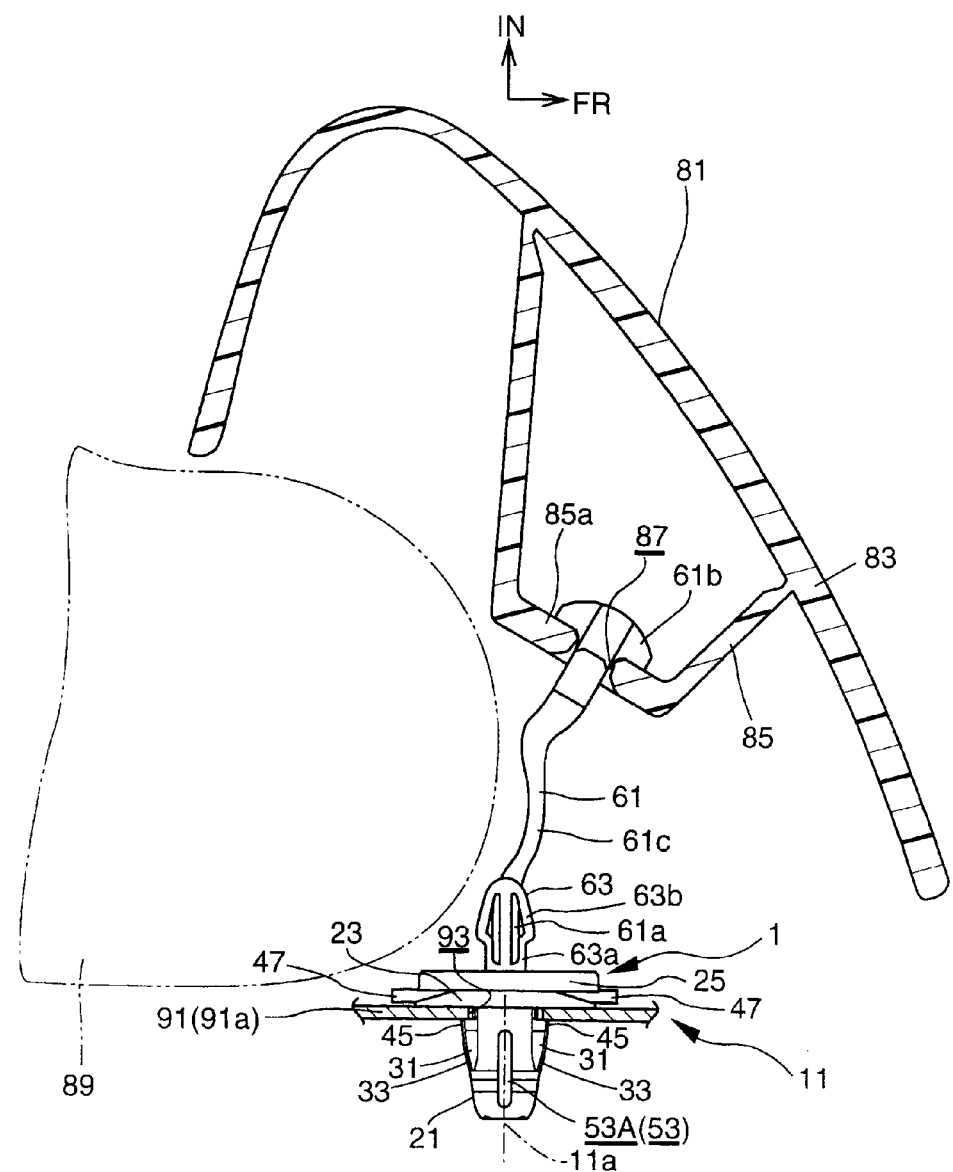

[FIG.16]
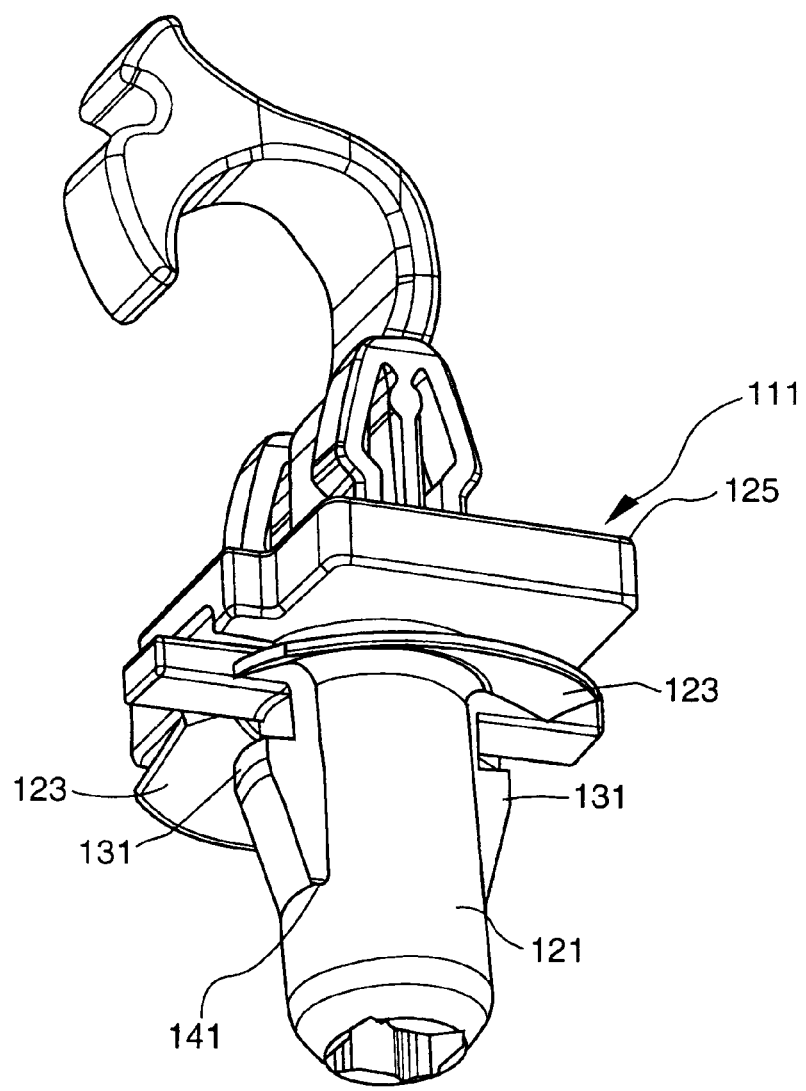

[FIG.17]
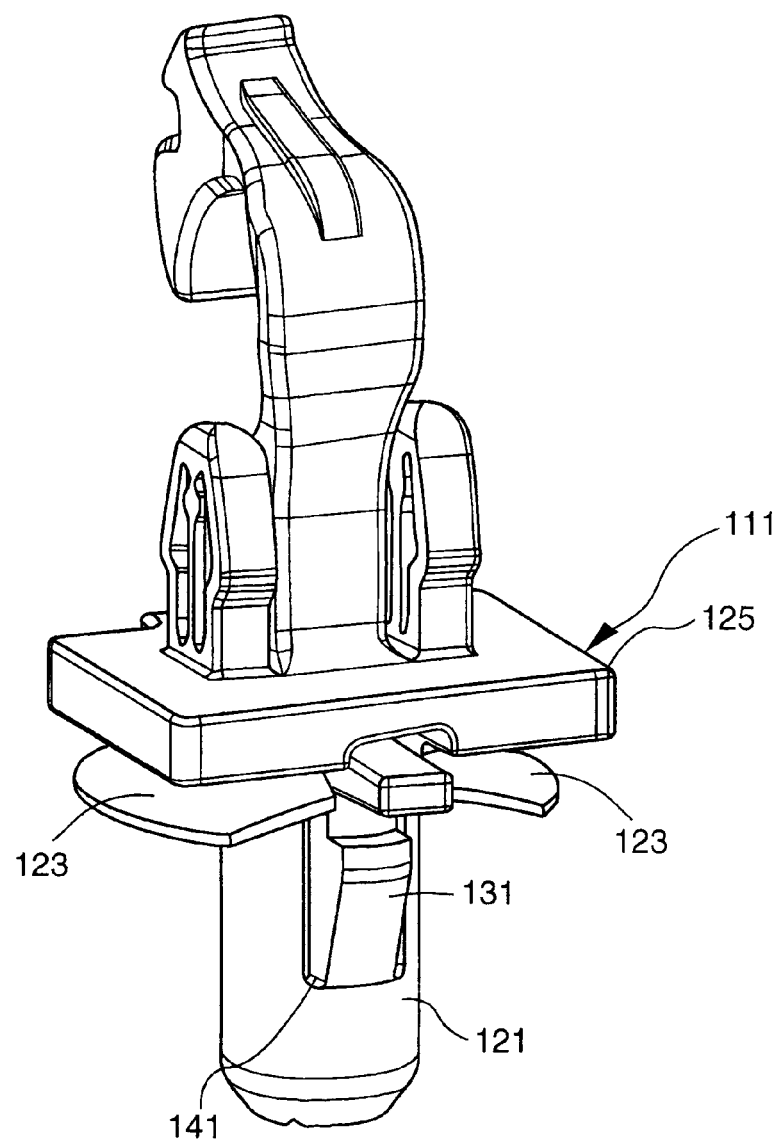

[FIG.18]
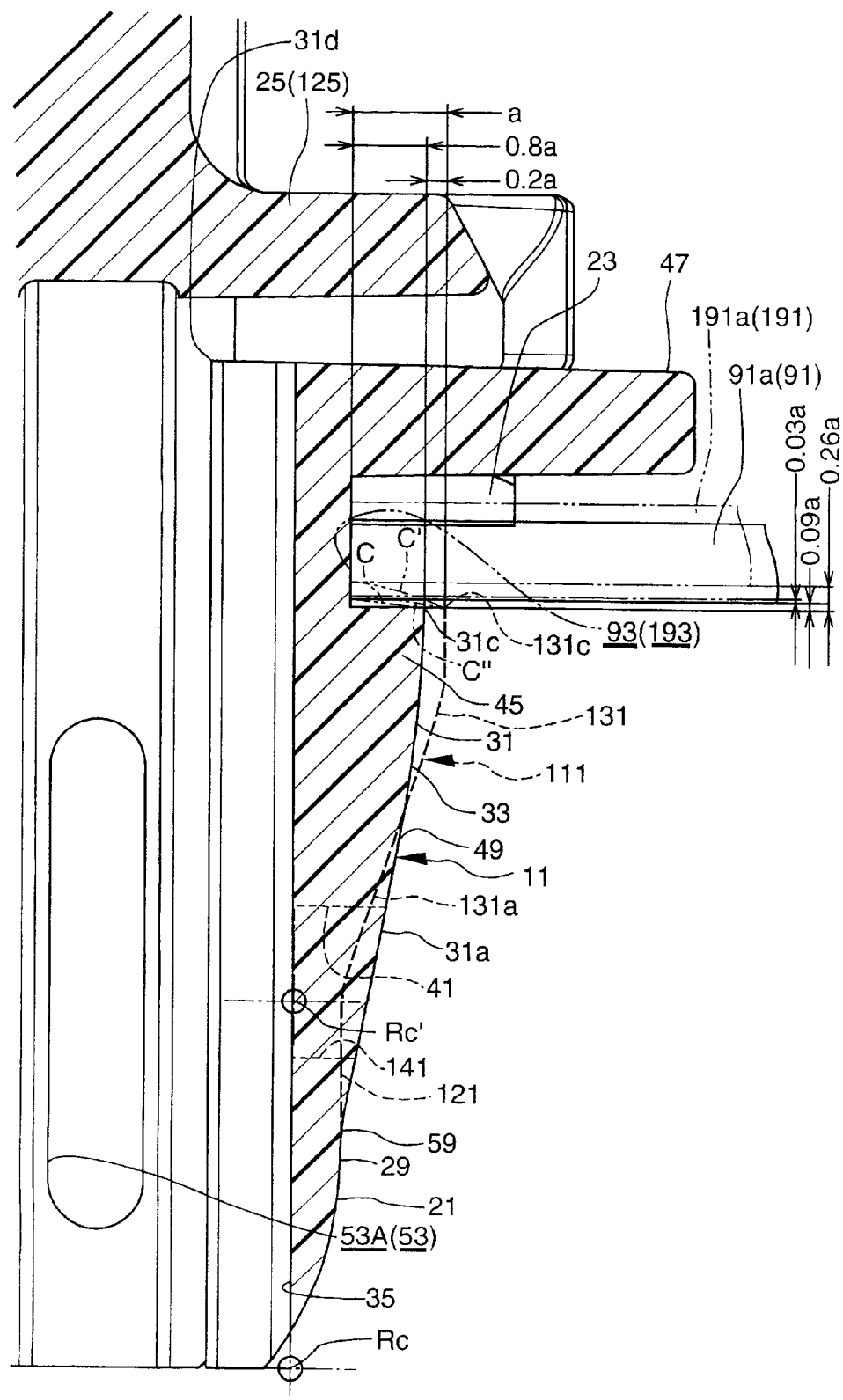

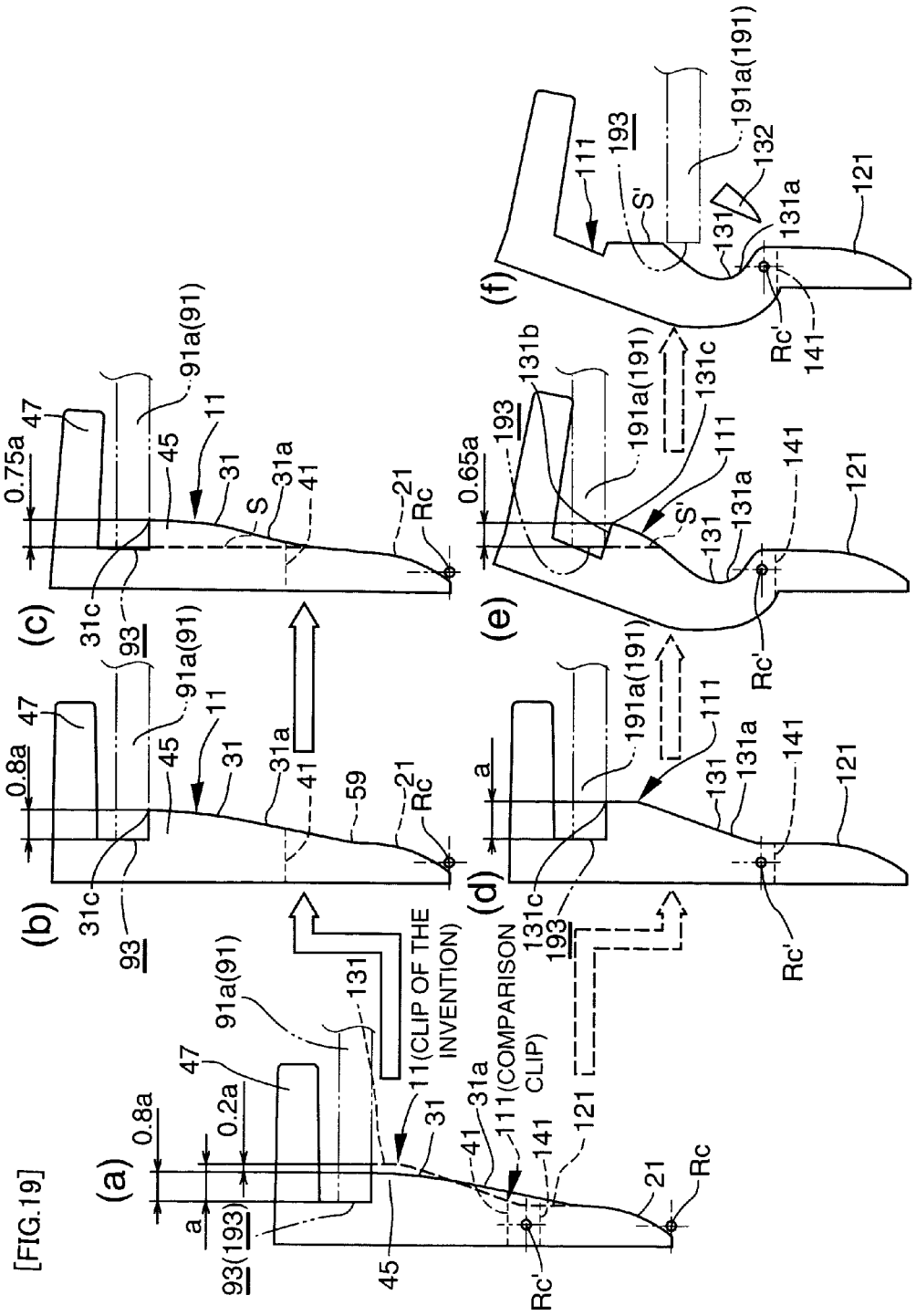
[FIG. 19]

[FIG.20]
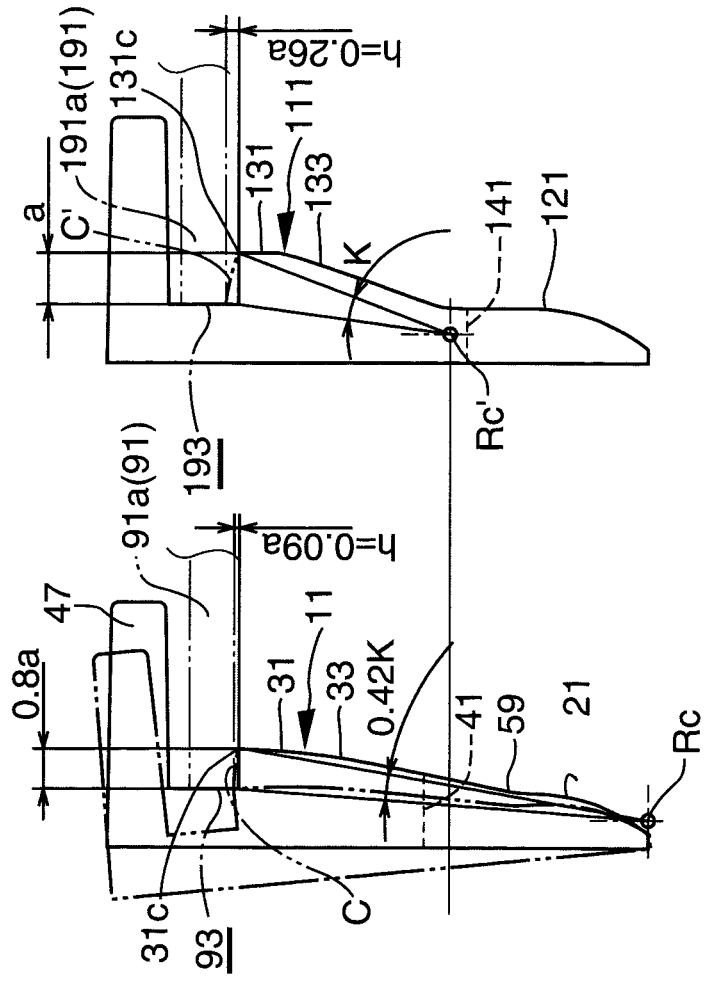

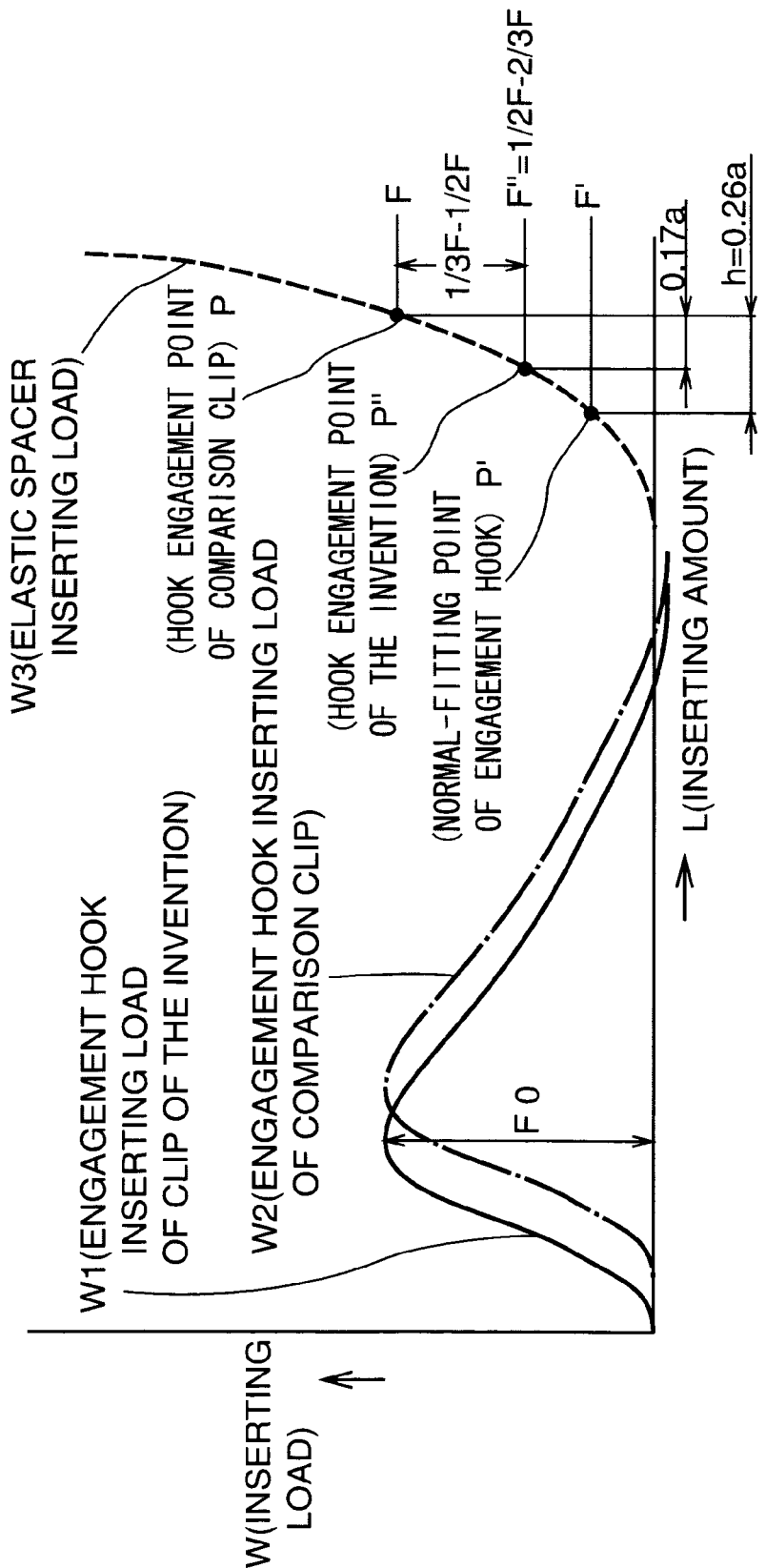

CLIP, AND PILLAR GARNISH FIXING STRUCTURE

TECHNICAL FIELD OF THE INVENTION

This application relates to a clip and a pillar garnish fixing structure using the clip. A pillar garnish fixing structure may be called a pillar garnish fixing apparatus.

BACKGROUND OF THE INVENTION

Patent Document 1 discloses a clip and a pillar garnish fixing structure using the clip. The conventional clip fixes a pillar garnish housing a curtain airbag, to a pillar and prevents the pillar garnish from being freely moved into a passenger compartment when the curtain airbag is deployed. "Curtain Airbag" may be called as "CSA", which means "Curtain Shield Airbag".

In FIGS. 16-17, (b) of FIG. 13, (d), (e) and (f) of FIG. 19 and (b) of FIG. 20, broken lines show a comparison clip 111. The comparison clip 111 is a reference clip for comparison with a clip of the present application and is not a known conventional clip. Portions of the comparison clip corresponding to portions of the present application clip are denoted with reference numerals added with "1" at tops (left sides) of the reference numerals of the portions of the present application clip. For example, reference numeral "131" in the comparison corresponds to reference numeral "31" in the present application.

The comparison clip 111 includes a seat 125, a shaft 121 extending in a direction away from the seat 125 and a pair of engagement hooks 131 opposing each other. Each of the pair of engagement hooks 131 is connected to the shaft 121 at a hook connecting portion 141 located at an opposite seat-side end of the engagement hook 131 and is separated from the shaft 121 by a slit except the hook connecting portion 141. The engagement hook 131 extends from the hook connecting portion 141 toward the seat 125 and ends in the form of a free end. In the comparison clip 111, the shaft 121 is circumferentially continuous at the same axial position as the hook connecting portion 141. A deformation promoting portion 53 of the present application later described, for promoting deformation of the hook connecting portion 141 toward a center axis line of the clip such as an elongated aperture is not provided at a pair of shaft wall portions opposing each other in a diametrical direction perpendicular to a direction in which the pair of engagement hooks 131 are opposed. The hook connecting portion 141, which is located at the same axial position as an end of the slit, is located at a position equal to a rotational deformation center Rc' of the engagement hook 131 or further from the seat 125 than the rotational deformation center Rc'.

RELATED ART DOCUMENT

Patent Document 1: Patent Publication JP 2013-180725

BRIEF SUMMARY

However, there are the following problems with the conventional clip:

The problems with the clip of Patent Document 1 will be explained using the comparison clip 111, because the problems are similar to those of the comparison clip 111.

(i) It is difficult to obtain both a desired strength of the engagement hook 131 and a serviceability of the clip.

(ii) In order to easily install the clip 111 to a body, installing the clip 111 to the body with a high reliability (without being accompanied by a half-fitting or a non-fitting), and suppressing a rotational play of the clip 111 relative to the body, further improvements are desired.

The above problems will be discussed in more detail below.

As to Problem (i)

When a large load such as a deployment load of the CSA is loaded on the engagement hook 131 from above in (b) of FIG. 13, a relatively large bending deformation may occur at a root portion 131a of the engagement hook as shown in (e) of FIG. 19. Since the wall of the shaft 121 is circumferencially continuous at the same axial position as the hook connecting portion 141, the hook connecting portion 141 is unlikely to be deformed toward a center axis line 111a of the clip as illustrated in (b) of FIG. 13. As a result, a body engagement surface 131b of the engagement hook 131 is inclined to a large extent causing it to be lowered in an outward direction so that a shear-breakage plane S' extending in an axial direction of the shaft (simply, "axial direction", hereinafter) is decreased in length in the axial direction. Therefore, a durability of the clip against a drawing-out load is reduced, and the clip is likely to be broken along the shear-breakage plane S' as illustrated in (f) of FIG. 19. Reference numeral 132 shows a broken piece. In order to decrease the bending deformation at the root portion 131a of the engagement hook, in (b) of FIG. 13, it will be necessary to increase a thickness "T" of the engagement hook 131 at the hook connecting portion 141 to thereby increase a thickness of the root portion 131a. In this instance, if the thickness "T" of the engagement hook 131 is increased by outwardly bulging an outside surface of the engagement hook 131, the clip 111 is unlikely to be inserted into a clip fixing aperture 193. If the thickness "T" of the engagement hook 131 is increased by inwardly bulging an inside surface of the engagement hook 131, when the pair of engagement hooks are inwardly rotated about the hook connecting portion 141, since upper corners 131d of the inside surfaces of the pair of engagement hooks 131 interfere with each other and rotating angles of the pair of engagement hooks are restricted, the clip 111 is unlikely to be inserted into the clip fixing aperture 193. As a result, it is difficult to satisfy at the same time both a strength (therefore, a thickness) of the engagement hook 131 and an easiness of passing the engagement hook 131 through the clip fixing aperture 193 at the times of installing and service.

As to Problem (ii)

The engagement hook 131 rotates in a direction toward or away from the center axis line 111a about the rotational deformation center "Rc'" which is located at the hook connecting portion 141 or slightly above the hook connecting portion as shown in (b) of FIG. 20. At that time, an upper corner 131c of the outside surface of the engagement hook 131 rotates about the rotational deformation center "Rc'" drawing an arc "C" and is shifted to a position located higher by an amount "h" in the axial direction of the shaft than an original position of the corner 131c before rotation of the engagement hook 131. When "a" is defined as an engagement amount of the engagement hook 131 of the comparison clip with a body panel 191a (simply, "body", hereinafter), the above amount "h" is calculated to be 0.26a. Therefore, the clip 111 has to be excess-inserted into the clip fixing aperture 193 in the axial direction of the shaft by the amount "h" in order that the engagement hook 131 can engage the body 191.

FIG. 21 is a graph illustrating an insertion load versus insertion amount characteristic when the clip 111 is inserted into the clip fixing aperture 193. At an early stage of insertion, an outside surface 133 of the engagement hook 131 contacts a corner and an inside surface of the rim of the body defining the clip fixing aperture 193, so that an engagement hook insertion load characteristic "W2" having a mountain shape shown in one-dotted chain line appears. On the other hand, an elastic spacer 123 (shown in FIGS. 16 and 17) is provided to the clip 111, in order to remove a play of the clip 111 relative to the body 191 when the clip 111 has been installed to the body 191. Therefore, when the elastic spacer 123 begins to contact the rim of the body defining the clip fixing aperture 193 at a final stage of insertion, a reaction force characteristic "W3" of the elastic spacer shown in a broken line in FIG. 21 and rising steeply appears.

As illustrated in FIG. 21, a hook engagement point "P" where the hook begins to engage the body is located at a position deeper than a hook normal fitting point "P'" (i.e., a position of the body engagement surface of the engagement hook in the axial direction of the shaft when the engagement hook is at a normal-fitting with the body) by the above-described excess-inserting amount "h" in a clip insertion direction. An elastic spacer reaction force "F" at the hook engagement point "P" is larger than an elastic spacer reaction force "F'" (which is the same as an elastic spacer reaction force at a normal operating condition of FIG. 13) operating at the hook normal fitting point "P'" by an amount ("F"-"F'"). In this instance, the elastic spacer reaction force "F'" operating at the hook normal fitting point "P'" is a load necessary to suppress a play of the clip relative to the body. The elastic spacer reaction force "F" at the hook engagement point "P" is a load determined from a working standard (i.e., a standard load of a working specification). In order to excess-insert the clip 111 by the amount "h" from the point "P'" to the point "P", since the clip inserting force "F" is larger than the elastic spacer reaction force "F'", it is necessary to push the clip at a large force, which is accompanied by a difficulty in an installing work. Further, as illustrated in FIG. 21, since there is no click feeling in a clip inserting load in the vicinity of the hook engagement point "P", it is difficult to acknowledge from a change in the inserting load that the engagement hook 131 has engaged the body 191. Therefore, it is difficult to distinguish a case where insertion of the clip is stopped in the vicinity of the peak "F0" of the engagement hook inserting load at the early stage of insertion from a case where the engagement hook has passed the hook engagement point "P" and has engaged the body. As a result, even if a half-fitting state where only one engagement hook of the pair of engagement hooks 131 engages the body or a non-fitting state where both engagement hooks of the pair of engagement hooks 131 do not engage the body has occurred, it is difficult to detect it. Therefore, reliability of installing the clip to the body is decreased.

Further, when the engagement hook 131 springs back to its free position after the engagement hook 131 has engaged the body 191, the shaft portion 121 is moved in a drawing-out direction by the excess-inserting amount "h" due to a reaction force of the elastic spacer 123, so that the reaction force of the elastic spacer 123 is decreased from "F" to "F'" in FIG. 21. Since the force "F" is determined from the working standard and can not be large, and since the excess-inserting amount "h" is as large as 0.26×a, the force "F'" is forced to be small. As a result, it will be disadvantageous to suppress tilting of the clip 111 relative to the body, when the engagement hook is at a normal-fitting state with the body.

In order to decrease the excess-inserting amount "h", it may be effective to decrease an engaging amount "a" of the engagement hook 131 with the body 191. However, in the comparison clip 111, as shown in (e) of FIG. 19, when a large load is loaded on the engagement hook 131, the body engagement surface 131b of the engagement hook is inclined due to a deformation of the hook root portion 131a. As a result, a substantial engaging amount of the engagement hook with the body 191 is decreased. Therefore, it is difficult to decrease the initial engaging amount "h" of the engagement hook with the body.

An object of the present application is to provide a clip and a pillar garnish fixing structure using the clip, where at least one of the following requirements can be achieved:
Both strength of an engagement hook and serviceability of the clip are satisfied; and
Easiness of installing the clip to a body, reliability of installing the clip to the body (i.e., reliability of preventing a half-fitting state and a non-fitting state of the clip from happening, and suppressing tilting of the clip) are achieved.

Means for Solving the Problems

A clip and a pillar garnish fixing apparatus for achieving the above object can take the aspects or embodiments described below, where reference numerals in brackets correspond to reference numerals shown in the accompanying drawings.

In a first aspect of the present application, a clip (11) is made from a resin having an elasticity and includes a seat (25), a hollow shaft (21) extending away from the seat (25) and having an interior space opening to an outside at an opposite seat-side end of the shaft, and a pair of engagement hooks (31) opposing each other. Each of the engagement hooks (31) is connected to the shaft (21) at a hook connecting portion (41) located at an opposite seat-side end of the engagement hook (31), is separated from the shaft (21) and the seat (25) by a slit (43) except for the hook connecting portion (41), and extends from the hook connecting portion (41) toward the seat (25).

In the clip, a distance (d) between outside surfaces (33) of the pair of engagement hooks (31) at the hook connecting portions (41), located at the same axial position as an opposite seat-side end of the slit, in a free state of the clip (11) is larger than a diameter (D) of a clip fixing aperture (93) of the body (91).

A deformation promoting portion (53) for promoting deformation of the hook connecting portion (41) and a hook root portion connected to the hook connecting portion in a direction toward a center axis line (11a) of the clip when the shaft (21) is inserted into a clip fixing aperture (93) formed at a body (91), is formed at each of a pair of shaft wall portions (21a) opposing each other and located in a diametrical direction perpendicular to a direction in which the pair of engagement hooks (31) are opposed. The deformation promoting portion (53) is constructed of at least one of an elongated aperture (53A) and a wall thickness decreased portion (53B).

The deformation promoting portion (53) extends in an axial direction of the shaft (21) and in opposite directions away from a position of the shaft corresponding to the hook connecting portion (41) in the axial direction of the shaft.

In a second aspect of the present application, in the first aspect above, each of the pair of engagement hooks (31) includes a protrusion (45) protruding further in a direction away from the center axis line (11a) of the clip than an outer surface (29) of the shaft (21) when each of the pair of engagement hooks (31) is in a free state. The protrusion (45) includes an inclined surface (49) extending in a direction from the hook connecting portion (41) toward the seat (25)-side end of each of the pair of engagement hooks (31) and away from the center axis line (11a) of the clip, at least at a portion of the protrusion (45) in a direction along the center axis line (11a) of the clip. An inclination-starting point (59) of the inclined surface (49) is located at a position spaced further from the seat (25) than the hook connecting portion (41), whereby an outside surface of each of the pair of engagement hooks protrudes more outward than the outer surface (29) of the shaft (21) in a radial direction of the shaft (21) at an axial shaft position corresponding to the hook connecting portion (41) in the axial direction of the shaft.

In a third aspect of the present application, in the first or the second aspects above, each engagement hook (31) has a hypothetical rotational deformation center "Rc" and the hypothetical rotational deformation center "Rc" is located further from the seat (25) than the hook connecting portion (41).

In a fourth aspect of the present application, in the third aspect above, the hypothetical rotational deformation center "Rc" is located at or in a vicinity of the opposite seat-side end of the shaft (21).

In a fifth aspect of the present application, in any one of the first-fourth aspects, the clip (11) includes an engagement releasing portion (47) connected to the seat (25)-side end of the each engagement hook (31) and extending in a direction away from the center axis line (11a) of the clip.

In a sixth aspect of the present application, in any one of the first-fifth aspects, the clip (11) is a tether clip for fixing a pillar garnish (81) to a pillar (91).

In a seventh aspect of the present application, a pillar garnish fixing structure (1) includes the pillar garnish (81) to be fixed to the pillar (91) using the clip (11) according to the sixth aspect.

According to the first aspect, the following technical advantages are obtained:

Since the deformation promoting portion is provided, the hook connecting portion can be easily deformed in the direction toward the center axis line, so that the hook connecting portion can easily pass through the clip fixing aperture when the clip is inserted into the clip fixing aperture. Further, while maintaining that the hook connecting portion and the root portion of the hook connecting portion can easily pass through the clip fixing aperture, a thickness of the hook connecting portion can be increased whereby a rigidity and a strength of the engagement hook can be increased. As a result, both of the serviceability and the strength of the engagement hook can be satisfied, so that the above problem (i) can be solved.

Since the deformation promoting portion is provided whereby the hook connecting portion can be deformed in the direction toward the center axis line, the hook connecting portion can be deformed both in a rotational direction and in a direction parallel to the seat. As a result, a rotational deformation center of the engagement hook is shifted in a direction away from the seat from a position located in the vicinity of the hook connecting portion to the hypothetical rotational deformation center located in the vicinity of a tip end of the shaft.

Further, since the rotational deformation center of the engagement hook is shifted to the hypothetical rotational deformation center located in the vicinity of the tip end of the shaft, a movement amount of an upper corner of the outside surface of the engagement hook in the axial direction of the shaft is decreased when the upper corner of the outside surface of the engagement hook is rotated about the hypothetical rotational deformation center drawing an arc. As a result, an excess-inserting amount and an excess-inserting force necessary to cause the engagement hook to engage the body are decreased. Due to the decrease in the excess-inserting force, work to install the clip is improved. Further, it is possible to insert the clip to a normal-fitting position by one pushing action due to a quickness with which the clip can ride over a peak of an inserting load of the inserting amount curve when the clip is inserted into the clip fixing aperture (i.e., a peak of an inserting load when an outside surface of the engagement hook slides relative to an inside surface of the clip fixing aperture). As a result, a half-fitting state and a non-fitting state of the pair of engagement hooks can be suppressed. Therefore, a reliability of installing the clip to the body is improved.

Furthermore, since the movement amount of the upper corner of the outside surface of the engagement hook in the axial direction of the shaft is decreased, the decrease in the reaction force of the elastic spacer, which is caused when the shaft is moved in the drawing-out direction after the engagement hook has engaged the body, is small. As a result, tilting of the clip which may be generated at the normal-fitting state of the engagement hook is suppressed.

As a result, the above-described problem (ii) increased work to install the clip to the body, a reliability of installing the clip to the body, and tilting of the clip, is solved or becomes possible to be solved.

Further, since the distance between the outside surfaces of the pair of engagement hooks at hook connecting portions of the pair of engagement hooks in the free state of the clip is set larger than the diameter of the clip fixing aperture of the body, the thicknesses of the hook connecting portion and the root portion of the engagement hook are large. Therefore, the rigidity of the hook connecting portion and the root portion of the engagement hook are surely made large, so that deformation of the engagement hook is suppressed when a drawing-out load is loaded on the engagement hook at the time of deployment of the CSA. As a result, an axial length of the engagement hook along the breakage plane of the engagement hook is made sufficiently large, so that a sufficient strength of the engagement hook can be obtained and a durability of the engagement hook against the drawing-out load at the time of deployment of the CSA can be improved.

Further, since the deformation promoting portion extends from the hook connecting portion in opposite directions in the axial direction of the shaft, the hook connecting portion can be easily deformed in the direction toward the center axis line of the clip, so that the above technical advantages of the first aspect can be surely obtained.

According to the second aspect, since the inclination-starting point of the inclined surface is located at a position spaced further from the seat than the hook connecting portion, the hook connecting portion can be made thick, so that the technical advantages of the first aspect can be surely obtained.

According to the third aspect, since the hypothetical rotational deformation center "Rc" is located further from the seat than the hook connecting portion, an angle of falling of the engagement hook at the time of inserting the shaft into the clip fixing aperture of the body is made small. As a result, an axial length of the engagement hook along the breakage plane of the engagement hook is made sufficiently large, so that a sufficient strength of the engagement hook can be obtained and a durability of the engagement hook against the drawing-out load at the time of deployment of the CSA can be improved. Further, an excess-inserting amount necessary to cause the engagement hook to engage the body can be made small.

According to the fourth aspect, since the hypothetical rotational deformation center "Rc" is located at or in the vicinity of the tip end of the shaft further from the seat, those technical advantages according to the third aspect can be surely obtained.

According to the fifth aspect, since the hypothetical rotational deformation center of the engagement hook is shifted to a tip end side of the shaft so that an angle of falling of the engagement hook is made small, an interference between the seat-side ends of the opposing surfaces of the pair of engagement hooks can be suppressed in spite that the lengths of the pair of engagement hooks are increased because the engagement releasing portions are provided.

According to the sixth aspect, the same technical advantages as those of the first to seventh aspects can be obtained in the tether clip.

According to the pillar garnish fixing structure according to the seventh aspect, since the pillar garnish is installed to the pillar using the clip according to the sixth aspect, the same technical advantages as those of the sixth aspect can be obtained in the pillar garnish fixing structure. In addition, the following technical advantages are obtained: Since inserting the clip into the clip fixing aperture and drawing-out the clip from the clip fixing aperture become easy, installing the pillar garnish to the pillar and drawing-out the clip from the body at the times of assembly and service become easy. Further, in a case where the thickness and the rigidity at the root portion of the engagement hook are made large, the durability of the clip against the drawing-out load is improved so that free movement of the pillar garnish into the passenger room at the time of deployment of the CSA can be surely suppressed.

BRIEF DESCRIPTION OF THE DRAWINGS

FIG. 1 is a front view of a clip according to a first embodiment of the present application in a state where the clip has been inserted into a clip fixing aperture;

FIG. 2 is an enlarged cross-sectional view of the clip of FIG. 1 taken along line 2-2 of FIG. 1;

FIG. 3 is a perspective view of the clip of FIG. 1;

FIG. 4 is a perspective view of the clip of FIG. 1 viewed in a direction different from FIG. 3;

FIG. 5 is a front view of a clip according to a second embodiment of the present application in a state where the clip has been inserted into a clip fixing aperture;

FIG. 6 is an enlarged cross-sectional view of the clip of FIG. 5 taken along line 6-6 of FIG. 5;

FIG. 7 is a perspective view of the clip of FIG. 5;

FIG. 8 is a perspective view of the clip of FIG. 5 viewed in a direction different from FIG. 7;

FIG. 9 is a front view of a clip according to a third embodiment of the present application in a state where the clip has been inserted into a clip fixing aperture;

FIG. 10 is an enlarged cross-sectional view of the clip of FIG. 9 taken along line 10-10 of FIG. 9;

FIG. 11 is a perspective view of the clip of FIG. 9;

FIG. 12 is a perspective view of the clip of FIG. 9 viewed in a direction different from FIG. 11;

FIG. 13 is a cross-sectional view illustrating only one engagement hook and its vicinity of the clip of the present application "having a deformation promoting portion" and only one engagement hook and its vicinity of a comparison clip "having no deformation promoting portion", compared with each other, where hatchings for showing a cross section are omitted;

FIG. 14 is a cross-sectional view of a pillar garnish fixing structure using the clip of FIG. 1;

FIG. 15 is a cross-sectional view of the pillar garnish fixing structure of FIG. 14 in a state where a CSA has been deployed;

FIG. 16 is a perspective view of the comparison clip;

FIG. 17 is a perspective view of the comparison clip of FIG. 16 viewed in a direction different from FIG. 16;

FIG. 18 is a cross-sectional view illustrating a difference between movement amounts of upper corners of outside surfaces of engagement hooks in an axial direction of a shaft, of the clip according to the first embodiment of the present application (shown in a full line) where an engagement amount of the engagement hook with a body panel is decreased by 0.2×a, and the comparison clip (shown in a broken line);

FIG. 19 includes the following subsidiary views (a) to (f), where (a) is a cross-sectional view of the engagement hook where hatchings for showing a cross section are omitted, of the clip according to the first embodiment of the present application where the engagement amount of the engagement hook with the body panel is decreased by 0.2×a, and the comparison clip, before a load is loaded on the engagement hook;

(b) is a cross-sectional view of the engagement hook where hatchings for showing a cross section are omitted, of the clip according to the embodiment of the present application before the load is loaded on the engagement hook or at an early stage when the load begins to be loaded on the engagement hook;

(c) is a cross-sectional view of the engagement hook where hatchings for showing a cross section are omitted, of the clip according to the embodiment of the present application after the load has been loaded on the engagement hook;

(d) is a cross-sectional view of the engagement hook where hatchings for showing a cross section are omitted, of the comparison clip before the load is loaded on the engagement hook or at an early stage when the load begins to be loaded on the engagement hook;

(e) is a cross-sectional view of the engagement hook, of the comparison clip after the load has been loaded on the engagement hook; and (f) is a cross-sectional view of the engagement hook, of the comparison clip when the load has been loaded on the engagement hook and the engagement hook has been broken;

FIG. 20 includes the following subsidiary views (a) and (b), where (a) is a cross-sectional view of the engagement hook where hatchings for showing a cross section are omitted, of the clip according to the first embodiment of the present application where the engagement amount of the engagement hook is decreased by 0.2×a, and where an engagement releasing portion has been pushed so that the engagement hook has been capable of being drawn-out from the body, and (b) is a cross-sectional view of the engagement hook where hatchings for showing a cross section are omitted, of a portion of the comparison clip corresponding to (a); and FIG. 21 is a graph for illustrating features about an inserting load (W) versus an inserting amount (L), of the clip according to the embodiment of the present application and of the comparison clip.

DETAILED DESCRIPTION

A clip 11, and a pillar garnish fixing structure 1 for fixing a pillar garnish to a body using the clip in a case where the clip 11 is a tether clip, according to the present application will be explained with reference to FIGS. 1-15, FIG. 18, (a), (b) and (c) of FIG. 19, (a) of FIG. 20 and FIG. 21. Since a main portion of the pillar garnish fixing structure 1 is the clip 11, the main portion of the clip 11 is the same as the main portion of the pillar garnish fixing structure 1. FIGS. 1-13 and FIGS. 18-20 illustrate the clip 11, and FIGS. 14 and 15 illustrate the pillar garnish fixing structure 1.

FIGS. 1-4 and FIGS. 18-21 illustrate a first embodiment of the present application, FIGS. 5-8 illustrate a second embodiment of the present application, and FIGS. 9-12 illustrate a third embodiment of the present application. FIGS. 13-15 and FIGS. 19-21 are applicable or substantially applicable to all embodiments of the present application.

Portions common to all embodiments of the present application are denoted with the same reference numerals over all embodiments of the present application. In FIGS. 14 and 15, "FR" illustrates a front direction of a vehicle, and "IN" illustrates an inward direction of a right-left direction of the vehicle.

First Embodiment

First, structures and operations of the clip 11 according to the first embodiment of the present application will be explained. In FIGS. 1-4 and FIGS. 18-21, a case where the clip 11 is a tether clip (denoted with the same reference numeral as the clip) is shown. However, the clip 11 may be a clip other than the tether clip. More particularly, the clip 11 may be a normal fixing clip for fixing a CSA to the body. FIG. 13 illustrates a relationship between a configuration of the clip 11 of the present application and a configuration of the comparison clip 111. In FIG. 13, (a) shows the clip 11 of the present application, and (b) shows the comparison clip 111. FIGS. 14 and 15 illustrate a pillar garnish fixing structure 1 for fixing a pillar garnish 81 to a body 91 using the clip 11.

The clip 11 is made from a resin having a deformability. The resin is, for example, polyhexamethylene adipamide. However, so long as the resin has a necessary strength, a resin other than polyhexamethylene adipamide may be used.

As illustrated in FIG. 1 and FIG. 2, the clip 11 has a center axis line 11a of the clip. As illustrated in FIGS. 1-4, the clip 11 is provided with a single seat 25, a single shaft 21 ("a shaft" may be called as "a leg portion", "a leg" or "a coupling portion to the body") extending away from the seat 25 and at least one pair of engagement hooks 31. The engagement hook 31 extends toward the seat 25 from a hook connecting portion 41 spaced from the seat 25 in an axial direction of the shaft 21. The engagement hook 31 may include a free end. A plurality of pairs of engagement hooks 31 may be provided. In the present embodiment, a pair of engagement hooks 31 is provided. Further, the clip 11 may include an elastic spacer 23. In the embodiment shown, the clip 11 includes the elastic spacer 23. The elastic spacer 23 may be manufactured integrally with the clip 11 as shown in the drawings or may be manufactured separately from the clip 11, though not shown in the drawings.

The shaft 21 is perpendicular to the seat 25. A center axis line of the shaft 21 coincides with the center axis line 11a of the clip 11. As illustrated in FIG. 2, the shaft 21 is hollow. A configuration of a cross section of the shaft 21 is substantially circular or substantially rectangular. The rectangle may be a square.

Each of a pair of openings is formed at the hollow shaft 21 and is defined by a slit 43. The openings are formed at portions of the hollow shaft 21 located on opposite sides of the center axis line 11a of the clip and opposing each other. As illustrated in FIGS. 3 and 4, each of the pair of engagement hooks 31 is provided at each of the pair of openings. The engagement hooks 31 oppose each other in a direction perpendicular to an axial direction of the clip.

As illustrated in (a) of FIG. 13 and FIGS. 3 and 4, each engagement hook 31 is connected to a wall of the shaft 21 at the hook connecting portion 41 located at an opposite seat-side end of the engagement hook 31. Each engagement hook 31 is separated from the shaft 21 and the seat 25 by an inverted U-letter shaped slit 43 except the hook connecting portion 41. The inverted U-letter shaped slit 43 exists between the engagement hook 31 and the shaft 21 connected by the seat 25 except the hook engagement portion 41. An axial position of an end of the slit 43 further from the seat 25 and an axial position of the hook connecting portion 41 coincide with each other in the axial direction of the shaft. Since the clip 11 is made from a resin having a deformability, the engagement hook 31 can elastically rotate in a direction toward-away from the center axis line 11a of the clip, i.e., in a falling-rising direction. In (a) of FIG. 13 and FIGS. 18-20, "Rc" shows a hypothetical rotational deformation center of the engagement hook 31.

As illustrated in FIGS. 1-4, (a) of FIG. 13 and FIG. 18, a deformation promoting portion 53 is formed at each of a pair of shaft wall portions 21a (shown in FIG. 2) opposing each other in a diametrical direction perpendicular to a direction in which the pair of engagement hooks 31 are opposed. The deformation promoting portion 53 is provided for promoting deformation of the hook connecting portion 41 and a hook root portion 31a connected to the hook connecting portion 41 in a direction toward the center axis line 11a of the clip and in the direction in which the pair of engagement hooks 31 oppose each other, when the shaft 21 is inserted into a clip fixing aperture 93 formed at a body 91 and is pushed by a rim of the body defining the clip fixing aperture 93. In above, the hook root portion 31a is defined as a hook portion (a) connected to the hook connecting portion 41 from a side of the engagement hook 31 and (b) extending from the hook connecting portion 41 to a position spaced from the hook connecting portion 41 by a half of a distance (M−ΔM) between the hook connecting portion 41 and a body engagement surface 31b of the engagement hook 31. The distance (M−ΔM) between the hook connecting portion 41 and the body engagement surface 31b of the engagement hook 31 is shorter than a distance "M" between the hook connecting portion 141 and the body engagement surface 131b of the comparison clip 111 by the amount "ΔM". In a case where a shaft portion connected to the hook connecting portion 41 from a side opposite the engagement hook 31 is bulged more outward than the clip fixing aperture 31 as shown in FIG. 2, the deformation promoting portion 53 allows the shaft portion connected to the hook connecting portion 41 from the side opposite the engagement hook 31 to be deformed toward the center axis line 11a of the clip in the direction in which the pair of engagement hooks 31 are opposed, when the shaft 21 is inserted into the clip fixing aperture 93 of the body. As a result, the shaft portion connected to the hook connecting portion 41 from the side opposite the engagement hook 31 can pass through the clip fixing aperture 93.

The deformation promoting portion 53 extends in the axial direction of the shaft 21. The deformation promoting portion 53 extends in opposite directions away from an axial shaft position corresponding to the hook connecting portion 41 in the axial direction of the shaft 21.

The deformation promoting portion 53 may be any one of an elongated aperture 53A, a wall thickness decreased portion 53B and a wall cut portion (which may be called as a split) 53C, as will be described later.

As illustrated in (a) of FIG. 13, the pair of engagement hooks 31 include inside surfaces 35 opposing each other and outside surfaces opposite the inside surfaces 35. Each inside surface 35 opposes the center axis line 11a of the clip. The pair of engagement hooks 31 define a space 39 (shown in (a) of FIG. 13) therebetween. The space 39 is an interior of the hollow shaft 21. The space 39 extends in the direction away from the seat 25 and opens to an outside of the shaft at the tip end of the shaft.

As illustrated in FIG. 2, a convexity-concavity 37 convex and concave in the direction in which the pair of engagement hooks 31 oppose each other is formed at opposing inside surfaces 35 of the pair of engagement hooks 31. The convexity-concavity 37 includes a convexity 37a and a concavity 37b. The convexity 37a formed at one of the pair of engagement hooks 31 and the concavity 37b formed at the other of the pair of engagement hooks 31 oppose each other in the opposing direction of the pair of engagement hooks 31. When the pair of engagement hooks 31 are deformed so as to approach each other about hypothetical rotational deformation center "Rc" (shown in (a) of FIG. 13 and FIG. 18), the convexity 37a formed at one of the pair of engagement hooks 31 enters the concavity 37b formed at the other of the pair of engagement hooks 31. As a result, rotationally deformable amounts of the pair of engagement hooks 31 in the directions to approach each other are increased compared with a case where no convexity-concavity 37 is provided. Further, since the convexity 37a operates as a reinforcing rib, a bending rigidity of each of the pair of engagement hooks 31 in the rotational direction is increased.

The convexity-concavity 37 is formed from the seat-side end of the engagement hook 31 to the opposite seat-side end of the shaft 21, over both of the inside surface of the engagement hook 31 and an inner surface 27 of the shaft 21, as shown in (a) of FIG. 13. The convexity-concavity 37 is formed over both of an entire length of the engagement hook 31 and a shaft portion from the hook connecting portion 41 of the engagement hook 31 to a tip of the shaft 21. Each of the convexity 37a and the concavity 37b of the convexity-concavity 37 extends straight in the axial direction of the clip 11 and is molded at the same molding step as that of the clip 11.

As illustrated in (a) of FIG. 13 and FIG. 18, each of the pair of engagement hooks 31 includes a protrusion 45 and an engagement releasing portion 47 (which may be called as a hook handling portion). The protrusion 45 and the engagement releasing portion 47 are spaced from each other in the axial direction of the clip.

In a free state of the engagement hook 31, i.e., in a state where no load is loaded on the engagement hook 31, the protrusion 45 protrudes more than the outer surface of the shaft 21 in the direction away from the center axis line 11a of the clip. In other words, a portion of the engagement hook 31 which protrudes more than the outer surface of the shaft 21 in the direction away from the center axis line 11a of the clip is called as the protrusion 45. The protrusion 45 includes an inclined surface 49 extending in a direction from the hook connecting portion 41 toward the seat 25-side end of the engagement hook 31 and away from the center axis line 11a of the clip, at least at a portion of the protrusion 45 in a direction along the center axis line 11a of the clip. The inclined surface 49 slides relative to the inside surface of the clip fixing aperture 93 when the clip 11 is inserted into the clip fixing aperture 93.

As illustrated in (a) of FIG. 13, an inclination-starting point 59 of the inclined surface 49 is located at a position spaced more from the seat 25 than the hook connecting portion 41 by an amount "ΔE" (ΔE>0). As a result, the outside surface of the engagement hook 31 protrudes more outward than the outer surface 29 of the shaft 21 by an amount "ΔT" in a radial direction of the shaft 21 at an axial shaft position corresponding to the hook connecting portion 41 in the axial direction of the shaft. Therefore, a thickness of the engagement hook 31 at the hook connecting portion 41 is thicker than a thickness "T" of the hook connecting portion 141 of the comparison clip 111 by the amount "ΔT" and becomes "T+ΔT". In spite that the thickness of the engagement hook 31 at the hook connecting portion 41 is increased, the engagement hook 31 can pass through the clip fixing aperture 93 because the hook connecting portion 41 can be moved toward the center axis line 11a of the clip by the deformation promoting portion 53.

Together with the increase in the thickness of the hook connecting portion 41, a thickness of the hook root portion 31a connected to the hook connecting portion 41 is increased to be larger than a thickness of the hook root portion 131a of the comparison clip 111 by a difference between a broken line (corresponding to the comparison clip) and a full line (corresponding to the present application) in FIG. 18. Corresponding to the increase in the thickness at the hook root portion 31a, a distance between the outside surfaces 33 of the pair of engagement hooks 31 at the hook root portions 31a is increased to be larger than a distance between the outside surfaces 133 of the pair of engagement hooks 131 of the comparison clip 111 at the hook root portions 131a. More particularly, as illustrated in (a) of FIG. 13, the distance "d" between the outside surfaces 33 of the pair of engagement hooks 31 at the hook connecting portions 41 in the free state of the clip 11 is designed to be larger than a diameter "D" of the clip fixing aperture 93 of the body 91. Therefore, a distance between the outside surfaces 33 of the pair of engagement hooks 31 at the hook root portions 31a in the free state of the clip 11 is larger than the diameter "D" of the clip fixing aperture 93 of the body 91, because the distance between the outside surfaces 33 of the pair of engagement hooks 31 at the hook root portions 31a is larger than the distance between the outside surfaces 33 of the pair of engagement hooks 31 at the hook connecting portions 41. In spite that the distance between the outside surfaces 33 of the pair of engagement hooks 31 at the hook connecting portions 41 is set larger than the diameter "D" of the clip fixing aperture 93 and in spite that the distance between the outside surfaces 33 of the pair of engagement hooks 31 at the hook root portions 31a is larger than the diameter "D" of the clip fixing aperture 93, the hook connecting portion 41 and the hook root portion 31a can pass through the clip fixing aperture 93, because due to the deformation promoting portion 53, the hook connecting portion 41 and the hook root portion 31a can be moved toward the center axis line 11a of the clip and the engagement hook 31 can rotate about the hypothetical rotational deformation center "Rc" toward the center axis line 11a of the clip.

As shown in (a) and (b) of FIG. 13 and FIG. 18, in the clip 11 of the present application, an axial length of the slit 43 is made smaller than that of the slit of the comparison clip 111, so that a position of the hook connecting portion 41 is shifted toward the seat 25. As a result, in the clip 11 of the present application, the hook connecting portion 41 is located closer to the seat 25 than the rotational deformation center "Rc'" of the comparison clip 111. In contrast, in the comparison clip 111, the hook connecting portion 141 is located equal to or further from the seat 25 than the rotational deformation center "Rc'" of the comparison clip 111. As a result, an axial length of the engagement hook 31 of the clip 11 of the application is shorter than that of the engagement hook 131 of the conventional clip 111, so that a bending rigidity of the engagement hook 31 is increased.

Further, in the clip 11 of the present application, the hypothetical rotational deformation center "Rc" is located further from the seat 25 than the hook connecting portion 41. More particularly, the hypothetical rotational deformation center "Rc" of the engagement hook 31 is located at or in the vicinity of the tip end of the shaft 21. In contrast, in the comparison clip 111, the rotational deformation center "Rc'" of the engagement hook 131 is located at the hook connecting portion 141 or at a position slightly closer to the seat 125 than the hook connecting portion 141.

As a result, in the clip 11 of the present application, the hypothetical rotational deformation center "Rc" of the engagement hook 31 is located closer to the end (the tip) of the engagement hook 131 than the rotational deformation center "Rc'" of the comparison clip 111. In more detail, in the clip 11 of the present application, since the deformation promoting portion 53 is provided at the shaft 21, the hook connecting portion 41 is possible not only to be rotatably deformed but also to be deformed in a direction parallel to the seat 25. As a result, the hypothetical rotational deformation center "Rc" of the engagement hook 31 is shifted to a side further from the seat 25 (a lower side in the drawing) than the rotational deformation center "Rc'" of the comparison clip 111. Further, since the hook root portion 31a is made thicker than the hook root portion 131a of the comparison clip and the length of the engagement hook 31 is made short, the bending rigidity of the engagement hook 31 is increased. Due to the increase in the bending rigidity, the hypothetical rotational deformation center "Rc" of the engagement hook 31 is more shifted to the side further from the seat 25 than the rotational deformation center "Rc'" of the comparison clip 111.

When the clip 11 is inserted into the clip fixing aperture 93 of the body 91 (e.g., an inner panel 91a of a pillar), an outer surface of the protrusion 45 (i.e., an outer surface 33 of the engagement hook 31) is pushed by an inside surface of the clip fixing aperture 93 and the engagement hook 31 is rotated about the hypothetical rotational deformation center "Rc" to approach the center axis line 11a of the clip. When the engagement hook 31 has passed through the clip fixing aperture 93, the engagement hook 31 springs back to an original position. After the engagement hook 31 has returned to its original position, a seat-opposing surface (i.e., a body engagement surface) 31b of the protrusion 45 is brought into engagement with a rim portion of the body defining the clip fixing aperture 93 in the axial direction of the clip, whereby the clip 11 is prevented from being drawn-out from the clip fixing aperture 93.

In a case where an engagement amount of the engagement hook 131 with the rim portion of the body defining the clip fixing aperture 193 of the comparison clip 111 having no deformation promoting portion 53 before the engagement hook 131 is deformed in a rotational direction is expressed as "a", in the present application, an engagement amount of the engagement hook 31 with the rim portion of the body defining the clip fixing aperture 93 before the engagement hook 31 is deformed in a rotational direction can be decreased by (0.1-0.3)×a from that amount "a" of the comparison clip 111. A reason for the limitation of (0.1×a) is that if a decrease in the engagement amount is smaller than (0.1×a), an effect due to the decrease in the engagement amount cannot be sufficiently obtained. A reason for the limitation of (0.3×a) is that if a decrease in the engagement amount is larger than (0.3×a), the engagement amount is too small to obtain a sufficient axial length of the engagement hook along the breakage plane S (shown in (c) of FIG. 19) and to get a sufficient strength. FIG. 18 and (a) of FIG. 13 illustrate a case where the engagement amount of the engagement hook is decreased by (0.2×a) and is (0.8×a).

The engagement releasing portion 47 is connected to the seat-side end of the engagement hook 31 and extends in the direction away from the center axis line 11a of the clip. An end of the engagement releasing portion 47 further from the center axis line 11a of the clip is located further from the center axis line 11a of the clip than an outer end of the protrusion 45. The end of the engagement releasing portion 47 further from the center axis line 11a of the clip is located further from the center axis line 11a of the clip than an outer end of the seat 25 so that the engagement releasing portion 47 can be easily handled. When removing the clip 11 from the clip fixing aperture 93 at the time of service, the engagement releasing portions 47 of the pair of engagement hooks 31 are pushed in directions in which the engagement releasing portions 47 approach each other so that a distance between the outer ends of the protrusions 45 becomes equal to or smaller than the inside diameter of the clip fixing aperture 93. Then, the clip 11 is pulled in the axial direction of the clip and the shaft 21 is drawn out from the clip fixing aperture 93.

Next, in a case where the clip 11 is a tether clip (reference numeral of the tether clip is "11", because the tether clip is the same member as the clip 11), an additional structure of the tether clip 11 to be added to the above-described structure of the clip 11 and a structure of a pillar garnish fixing structure 1 using the tether clip 11 will be explained together with operations thereof. The pillar garnish fixing structure 1 includes the tether clip 11, a pillar as a body (reference numeral 11 is used for the pillar), and a pillar garnish 81 to be fixed to the pillar 91 using the tether clip 11.

The pillar garnish 81 is made from a plastic having a hardness equal to or harder than that of the clip 11. As illustrated in FIGS. 14 and 15, the pillar garnish 81 is coupled to an inner panel 91a of the pillar 91 using the tether clip 11. The pillar garnish 81 includes a garnish body 83 and a tether housing portion 85. At a bottom wall 85a of the tether housing portion 85, a rectangular tether inserting aperture 87 is formed. A rounded or folded CSA 89 is disposed at a space surrounded by the inner panel 91a of the pillar 91 and the garnish body 83. The CSA 89 is deployed at the time of a side collision of the vehicle or a rollover and pushes the pillar garnish 81 in a direction away from the pillar 91. FIG. 15 shows a portion of the CSA 89 which is being deployed.

As illustrated in FIGS. 1, 3 and 4 or FIG. 5, the tether clip 11 includes a tether 61 and an engagement holding portion 63. The tether 61 and the engagement holding portion 63 can be the same as a tether and an engagement holding portion 63 of the comparison tether clip 111.

The tether 61 includes a rising portion 61a rising from the seat 25 in a direction opposite the shaft 21, an anchor 61b provided at an end of the tether further from the seat 25 and a connecting portion 61b connecting the rising portion 61a and the anchor 61b. The connecting portion 61c may be curved. A direction along which the connecting portion 61c is curved may be a direction perpendicular to a longitudinal direction of the pillar garnish 81, or a longitudinal direction of the pillar garnish 81.

The anchor 61b has a rectangular configuration smaller than the tether inserting aperture 87 formed at the tether housing portion 85 of the pillar garnish 81. When inserting the tether 61 into the tether housing portion 85, a phase of the anchor 61b and a phase of the tether inserting aperture 87 are made coincident with each other, and then the anchor 61b is inserted into the tether inserting aperture 87. After the tether 61 has been inserted into the tether housing portion 85, the tether clip 11 is rotated about the center axis line 11a of the clip by 90 degrees so that the tether clip 11 cannot be drawn out from the tether housing portion 85. Then, the pillar garnish 81 coupled with the tether clip 11 is pushed against the pillar 91, and the shaft 21 of the tether clip 11 is pushed into the clip fixing aperture 93 of the pillar 91, whereby the pillar garnish 81 with the tether clip 11 is fixed to the pillar 91. FIG. 14 illustrates a state where the pillar garnish 81 coupled with the tether clip 11 has been coupled to the pillar 91.

The engagement holding portion 63 rises from the seat 25 in a direction opposite the shaft 21. The engagement holding portions 63 are provided at opposite sides of the rising portion 61a of the tether 61. The engagement holding portions 63 are spaced from the rising portion 61a.

The engagement holding portion 63 includes a rising portion 63a rising from the seat 25 by an amount substantially equal to a thickness of the bottom wall 85a of the tether housing portion and a bulged portion 63b further extending from a tip of the rising portion 63a in the direction away from the seat 25 and bulged in a direction perpendicular to the rising direction of the rising portion 63a. The bulged portion 63b is formed hollow so that the bulged portion 63b has an elasticity in the direction perpendicular to the rising direction of the rising portion 63a.

When coupling the tether clip 11 to the pillar garnish 81, the engagement holding portion 63 is pushed into the tether inserting aperture 87 of the tether housing portion 85. At that time, the bulged portion 63b is elastically deformed in a bulging amount decreasing direction, whereby the bulged portion 63b can pass through the tether inserting aperture 87 to an interior of the tether housing portion 85. Upon having passed through the tether inserting aperture 87, the bulged portion 63b elastically returns to an original position (a position of a free state of the bulged portion) and holds the bottom wall of the tether housing portion 85 between the bulged portion 63b and the seat 25. While the engagement holding portion 63 is holding this state, the tether clip 11 is installed to the pillar 91.

When the pillar garnish 81 is pushed by the CSA 89 at the time of deployment of the CSA, a rim portion of the tether housing portion defining the tether inserting aperture 87 pushes the bulged portion 63a of the engagement holding portion 63 in a drawing-out direction, thereby deforming the bulged portion 63a in the bulging amount decreasing direction. As a result, the bulged portion 63a passes through the tether inserting aperture 87 and the bottom wall 85a of the tether housing portion 63 is disengaged from the bulged portion 63a.

As a result, the pillar garnish 81 is moved in the direction away from the pillar 91 until the anchor 61b of the tether 61 is brought into contact with the rim portion of the bottom wall 85a of the tether housing portion defining the tether inserting aperture 87, whereby a space for deployment of the CSA 89 is formed between the pillar garnish 81 and the inner panel 91a. As illustrated in FIG. 15, when the anchor 61b contacts the rim portion of the bottom wall 85a defining the tether inserting aperture 87, the pillar garnish 81 cannot move further, so that the pillar garnish 81 is prevented from moving freely toward the passenger compartment.

As illustrated in FIG. 15, the CSA 89 is deployed into the passenger compartment to a position between a passenger and a side door through the space formed between the inner panel 91a and the garnish 83, thereby restricting and protecting a head of the passenger. The tether clip 11 allows the pillar garnish 81 to move by a predetermined amount thereby forming the deployment space, but restricts the pillar garnish 81 to move more than that predetermined amount.

The structures described above can be applied to all of the embodiments of the present application.

The clip 11 according to the first embodiment of the present application further includes the following structures:

As illustrated in FIGS. 1-4 and (a) of FIG. 13, the deformation promoting portion 53 includes an elongated aperture 53A formed at each of the pair of shaft wall portions 21a and extending in the axial direction of the shaft 21. The elongated aperture 53A extends from a position closer to the seat 25 than the hook connecting portion 41 to a position further from the seat 25 than the hook connecting portion 41 and ends at a position closer to the seat 25 than the tip of the shaft 21. The hook connecting portion 41 is located between opposite ends of the elongated aperture 53A in the axial direction of the shaft 21. The elongated aperture 53A is not open outward in the axial direction of the shaft. The shaft 21 is discontinuous in a circumferential direction of the shaft at an axial range where the elongated aperture 53A exists. The shaft 21 is continuous in the circumferential direction of the shaft at an axial range further from the seat 25 than the elongated aperture 53A. The elongated aperture 53A has a constant width at the free state of the clip 11. When the clip 11 is inserted into or drawn out from the clip fixing aperture 93, the engagement hooks 31 are elastically deformed so as to approach each other and opposite rims of the shaft defining the clip fixing aperture 93 are elastically deformed so as to approach each other at a longitudinal center portion of the elongated aperture 53A. The elongated aperture 53A has a sufficient width so that the rims do not contact each other, even when the opposite rims of the shaft defining the clip fixing aperture 93 are deformed.

Next, technical advantages of the clip 11 according to the first embodiment of the application and the pillar garnish fixing structure 1 will be explained.

Since the deformation promoting portions 53 are provided at the shaft 21, when an outside surface of each of the pair of engagement hooks 31 is pushed by the inside surface of the rim portion of the body defining the clip fixing aperture 93, the hook connecting portion 41, the hook root portion 31a and a portion of the shaft connecting to the hook connecting portion 41 from a side opposite the hook root portion 31a can be deformed in the direction toward the center axis line 11a of the clip. As a result, the hook connecting portion 41, the hook root portion 31a and the portion of the shaft connecting to the hook connecting portion 41 from the side opposite the hook root portion 31a can pass through the clip fixing aperture 93.

As illustrated in (a) and (b) of FIG. 13, the hypothetical rotational deformation center "Rc" of the engagement hook 31 at the time of passing through the clip fixing aperture 93 is shifted in a direction further from the seat 25, i.e., downward in the drawing, than the hypothetical rotational deformation center "Rc'" of the engagement hook 131 of the comparison clip 111. As a result, even if a thickness "T" of the connecting portion 41 is made larger by "ΔT" than a thickness T (shown in (b) of FIG. 13) of the comparison clip 111 and is increased to "T+ΔT" (shown in (a) of FIG. 13), the connecting portion 41 can be deformed toward the center axis line 11a. Therefore, as illustrated in (a) of FIG. 13, the hook connecting portion 41, the hook root portion 31a and the portion of the shaft connecting to the hook connecting portion 41 from the side opposite the hook root portion 31a can pass through the clip fixing aperture 93. As a result, while maintaining the passableness of the hook connecting portion 31a and the hook root portion 31a through the clip fixing aperture 93, the rigidity and strength of the engagement hook 31 at the hook root portion 31a can be increased, by increasing the thickness of the engagement hook 31 at the hook root portion 31a. Due to the increase in the rigidity and strength, a deformation of the engagement hook 31 when the CSA is deployed and a large load is loaded on the engagement hook 31 is changed from (e) of FIG. 19 illustrating a deformation in the comparison clip 111 to (c) of FIG. 19 illustrating a deformation in the clip 11 of the present application. As a result, a length of the shear-breakage plane is increased from "S'" of the comparison clip 111 shown in (e) of FIG. 19 to "S" of the clip 11 shown in (c) of FIG. 19 so that the clip 11 is unlikely to be broken along the plane "S" in (c) of FIG. 19. As a result, both the strength and rigidity and the serviceability of the clip are satisfied, and the previously described problem (i) is solved.

The following technical advantages are further obtained:

Since the deformation promoting portion 53 is provided, the hypothetical rotational deformation center "Rc" of the engagement hook 31 can be shifted from the position located slightly higher than the hook connecting portion 111 of the comparison clip 111 shown in (b) of FIG. 20 to the position located further from the seat 25 than the hook connecting portion 141 (or 41), for example, to the position located in the vicinity of the opposite seat-side end of the shaft 21 shown in (a) of FIG. 20. Further, as illustrated in FIG. 18, by making the thickness of the hook root portion 31a of the engagement hook 31 larger than that of the engagement hook 131a of the comparison clip 111 and/or by shifting the position of the hook connecting portion 41 to a position closer to the seat 25 than the hypothetical rotational deformation center "Rc'" of the comparison clip 111 thereby to make a length of the engagement hook 31 short, the rigidity of the engagement hook 31 is increased. Due to the increased rigidity of the engagement hook 31, the hypothetical rotational deformation center "Rc" of the engagement hook 31 is moved so as to be more spaced from the seat 25 (i.e., is moved downward in the drawing).

As illustrated in FIG. 18 and (b) of FIG. 20, in the comparison clip 111, a movement amount "h" of an upper corner 131c of an outside surface of engagement hook 131 in an axial direction of the shaft when the upper corner 131 is rotated about the hypothetical rotational deformation center "Rc'" drawing an arc, is (0.26×a). In contrast, as illustrated in FIG. 18 and (a) of FIG. 20, in the clip 11 of the present application, a movement amount "h" of an upper corner 31c of an outside surface of the engagement hook 31 in the axial direction of the shaft when the upper corner 31 is rotated about the hypothetical rotational deformation center "Rc" drawing an arc, is (0.09×a). Accordingly, by lowering the hypothetical rotational deformation center "Rc" of the engagement hook 31 in FIG. 20, the axial movement amount "h" of the movement amount "h" of an upper corner 131c of an outside surface of engagement hook 131 in an axial direction of the shaft is decreased from (0.26×a) shown in (b) of FIG. 20 to (0.09×a) shown in (a) of FIG. 20. Though the engagement amount of the engagement hook with the body in (a) of FIG. 20 is (0.8×a), even if the engagement amount is increased to "a", the movement amount "h" of an upper corner 31c of an outside surface of engagement hook 31 in the axial direction of the shaft when the upper corner 31 is rotated about the hypothetical rotational deformation center "Rc" drawing an arc, is about (0.12×a). Therefore, an increment of the movement amount "h" from (0.09×a) to (0.12×a) is small.

As a result, an excess-inserting amount (equal to "h") necessary to cause the engagement hook 31 to engage with the body 91 can be decreased by a decrement of the movement amount "h" of an upper corner 31c of an outside surface of engagement hook 31 in the axial direction of the shaft, i.e., by the amount of (0.26×a−0.09×a)=(0.17×a) (shown in FIG. 21). Corresponding to the decrease in the excess-inserting amount, as illustrated in FIG. 21, a reaction force (F'') of the elastic spacer of the clip 11 of the present application at a hook engagement point (P'') is decreased by an amount of (⅓×F−½×F) from the reaction force (F) of the elastic spacer of the comparison clip 111 at a hook engagement point (P) to (½×F−⅔×F). Since the clip 11 can be installed to the body 91 using the decreased inserting force of (½×F−⅔×F)=(F''), an easiness of installing the clip 11 to a body is improved. Further, since the reaction force (F'') of the elastic spacer at the hook engagement point (P'') is decreased to (½×F−⅔×F), the clip 11 can be inserted to the hook engagement point (P'') where the reaction force (F'') of the elastic spacer 23 is (½×F−⅔×F), due to a quickness with which the clip 11 passes over a peak (F0) of an inserting load of the engagement hook 31 when the clip 11 is inserted into the clip fixing aperture 93. Therefore, a half-fitting and a non-fitting of the pair of engagement hooks 31 can be prevented from happening. As a result, a reliability of installing the clip 11 to the body is improved.

After the engagement hook 31 has engaged the body, the engagement hook 31 returns to a free state and the shaft 21 is moved in a drawing direction by the amount of "h" of the upper corner 31c of the outside surface of the engagement hook 31 in the axial direction of the shaft. Due to the decrease in the movement amount "h" from (0.26×a) to (0.09×a), i.e., due to the decrement of (0.17×a), the reaction force of the elastic spacer 23 also is decreased. As illustrated in FIG. 21, with the comparison clip 111, the reaction force of the elastic spacer is decreased from (F) to (F'). In contrast, with the clip 11 of the present application, in a case where the reaction force (F') of the clip 11 of the present application is fixed to the reaction force (F') of the comparison clip 111, the reaction force of the elastic spacer is decreased only from (F'') to (F'). As a result, within a range that the reaction force (F'') of the elastic spacer of the present application does not exceed the reaction force (F) of the elastic spacer of the comparison clip which is determined from the working standard, the reaction force (F''') of the elastic spacer of the present application is allowed to be raised. Corresponding to the rise of the reaction force (F''') of the elastic spacer, the reaction force (F') also of the elastic spacer of the present application can be made larger than the reaction force (F') of the elastic spacer of the comparison clip. Due to making the reaction force (F') of the elastic spacer large, tilting of the clip 11 relative to the body 91 during a normal use can be suppressed. As a result, the previously described problems (ii) regarding easiness of installing the clip to a body, reliability of installing the clip to the body, and suppressing tilting of the clip are solved or can be solved.

The increase in the thickness of the engagement hook at each of the hook connecting portion 41 and the hook root portion 31a is obtained not by bulging the inside surface 35 toward the center axis line 11a of the clip, but by bulging the outside surface 33 outward. Due to the increase in the thickness of the engagement hook at each of the hook connecting portion 41 and the hook root portion 31a, the rigidity of the engagement hook at each of the hook connecting portion 41 and the hook root portion 31a is increased. As a result, when a deployment load of the CSA is loaded on the body engagement surface 31b, a large bending deformation as shown in (e) of FIG. 19 is suppressed from being generated. Further, since the inside surface 35 of the engagement hook 31 is not bulged toward the center axis line 11a of the clip, when each of the pair of engagement hooks 31 is deformed to fall inwardly at the time of installing the clip 11 to the body 91 or removing the clip 11 from the body 91, the inside surfaces 31d of the seat-side ends of the engagement hooks 31 are suppressed from interfering with each other.

Further, due to the decrease in the excess-inserting amount "h" caused by the decrement of (0.1–0.3)×a of the hook engagement amount, an over-stroke of the clip from the normal-fitting position at the time of fixing the clip to the body can be decreased. For example, in the case where the hook engagement amount "a" is decreased by (0.2×a), the over-stroke of the clip 11 can be decreased by about (0.3×a)=(0.12×a−0.09×a). Accordingly, the previously described problem (ii) can be surely solved. Further, since the hypothetical rotational deformation center "Rc" of the engagement hook 31 is positioned far away from the seat whereby deformation of the engagement hook 31 and inclination of the body engagement surface 31b are suppressed, in spite that the engagement amount of the engagement hook 31 with the rim portion of the body defining the clip fixing aperture is decreased by (0.1–0.3)×a, a length of the shear-breakage plane "S" in the axial direction of the shaft and a strength of the engagement hook 31 are ensured, as illustrated in (c) of FIG. 19.

Since the clip 11 is a clip of a type including the engagement releasing portion 47, a length of the engagement hook 31 from the hook connecting portion 41 to the engagement releasing portion 47 is increased by an increment due to the engagement releasing portion 47. However, since the hypothetical rotational deformation center "Rc" of the engagement hook 31 is positioned far away from the seat, a falling angle of the engagement hook 31 caused when the engagement hook 31 is deformed to inwardly incline is decreased from (K) in the case of the comparison clip 111 to (0.42×K) of the present embodiment, as illustrated in FIG. 13. Due to the decrease in the falling angle of the engagement hook 31 also, the inside surfaces 31d of the seat-side ends of the engagement hooks 31 are suppressed from interfering with each other.

The same technical advantages as the above-described technical advantages of the clip 11 are obtained also in the tether clip shown in the drawing. Further, the same technical advantages as the above-described technical advantages of the clip 11 are obtained also in a clip other than the tether clip, for example, a CSA-fixing clip.

Since the pillar garnish 81 is fixed to the pillar 91 using the clip 11 in the pillar garnish fixing clip 1, the same technical advantages as the above-described technical advantages of the clip 11 can be obtained in the pillar garnish fixing clip 1 also. In addition, the following technical advantages are obtained:

Since the features regarding insertion the clip 11 into and removing the clip 11 from the clip fixing aperture 93 are improved, the features regarding installing the pillar garnish 81 to the pillar 91 and removing the pillar garnish 81 from the pillar 91 at the time of service are improved. Further, the thicknesses and rigidities of the hook connecting portion 41 and hook root portion 31 are ensured, the durability of the clip 11 against the drawing-out load is improved so that free movement of the pillar garnish 81 into the passenger compartment at the time of deployment of the CSA can be surely suppressed.

The above-described technical advantages are applicable to all embodiments of the present application.

According to the first embodiment, the following technical advantages are further obtained:

Since the deformation promoting portion 53 is constructed of an elongated aperture 53A and the hook connecting portion 41 is located between the opposite ends of the elongated aperture 53A in the axial direction of the shaft, the shaft 21 can be easily deformed at the range of the shaft where the deformation promoting portion 53 is provided. Accordingly, a force of inserting the shaft 21 into and removing the shaft 21 from the clip fixing aperture 93 is smaller than a force of inserting and removing of the comparison clip. As a result, in the clip 11 and the pillar garnish fixing structure 1 using the clip 11, the features of installing the clip 11 and the pillar garnish 81 to the inner panel 91a of the pillar become better than those of the comparison clip 111 having no deformation promoting portion 53.

Second Embodiment

FIGS. 5-8 and (a) of FIG. 13 illustrate the clip 11 of the second embodiment of the present application. FIGS. 14 and 15 are applied to the pillar garnish fixing structure 1 of the second embodiment of the present application using the clip 11. In the clip 11 of the second embodiment, the deformation promoting portion 53 is constructed of a wall thickness decreased portion 53B. The clip 11 of the second embodiment has the same structures, operations and technical advantages as those of the first embodiment except the deformation promoting portion 53. The structures, operations and technical advantages which are applicable to all embodiments of the present application, among those of the first embodiment are applied to those of the second embodiment.

In addition to the structures, operations and technical advantages which are applicable to all embodiments of the present application, among those of the first embodiment, the second embodiment further has the following structures, operations and technical advantages:

Regarding the structures and operations, as illustrated in FIGS. 5-8 and (a) of FIG. 13, the deformation promoting portion 53 is constructed of the wall thickness decreased portion 53B. The wall thickness decreased portion 53B extends from a position located closer to the seat 25 than the hook connecting portion 41 to a position located further away from the seat 25 than the hook connecting portion 41 and ends at a position located closer to the seat 25 the further end from the seat 25, of the shaft 21. The hook connecting portion 41 is located between the axially opposite ends of the wall thickness decreased portion 53B in the axial direction of the shaft. A shaft portion from the opposite seat-side end of the wall thickness decreased portion 53B to the tip end of the shaft 21 may be a wall thickness non-decreased portion or a cut portion (slit) 53D as shown in the drawing extending in the axial direction of the shaft. The shaft 21 is continuous in the circumferential direction of the shaft at an axial range where the wall thickness decreased portion 53B exists. A thickness of the wall thickness decreased portion 53B is thinner than a shaft portion connecting to the wall thickness decreased portion 53B in the circumferential direction of the shaft. The thickness of the wall thickness decreased portion 53B is determined such that when inserting the clip 11 into or removing the clip 11 from the clip fixing aperture 93, the pair of engagement hooks 31 can be elastically deformed to approach each other, so that the opposite rims of the wall thickness decreased portion 53B in a width direction of the wall thickness decreased portion 53B are elastically deformed to approach each other.

Regarding the technical advantages, since the deformation promoting portion 53 is constructed of the wall thickness decreased portion 53B and the hook connecting portion 41 is located between the axially opposite ends of the wall thickness decreased portion 53B in the axial direction of the shaft, the shaft 21 can be easily deformed at a range of the shaft where the wall thickness decreased portion 53B is provided. Accordingly, the force of inserting the shaft 21 into and removing the shaft 21 from the clip fixing aperture 93 is smaller than the force of inserting and removing of the comparison clip 93 having no deformation promoting portion 53. As a result, in the clip 11 and the pillar garnish fixing structure 1 using the clip 11, the features of installing the clip 11 and the pillar garnish 81 to the inner panel 91*a* of the pillar are better than those of the comparison clip 111 having no deformation promoting portion 53.

Third Embodiment

FIGS. 9-12 and (a) of FIG. 13 illustrate the clip 11 of the third embodiment of the present application. FIGS. 14 and 15 are applied to the pillar garnish fixing structure 1 of the third embodiment of the present application using the clip 11. In the clip 11 of the third embodiment, the deformation promoting portion 53 is constructed of a wall cut portion 53C. The clip 11 of the third embodiment has the same structures, operations and technical advantages as those of the first embodiment except the deformation promoting portion 53. The structures, operations and technical advantages which are applicable to all embodiments of the present application, among those of the first embodiment are applied to those of the third embodiment.

In addition to the structures, operations and technical advantages which are applicable to all embodiments of the present application, among those of the first embodiment, the third embodiment further has the following structures, operations and technical advantages:

Regarding the structures and operations, as illustrated in FIGS. 9-12 and (a) of FIG. 13, the deformation promoting portion 53 is constructed of the wall cut portion 53C extending in the axial direction of the shaft 21 at each of the pair of shaft wall portions 21*a*. The wall cut portion 53C extends from a position positioned closer to the seat 25 than the hook connecting portion 41 to the tip end of the shaft 21 and opens to an outside. The shaft 21 is discontinuous in the circumferential direction of the shaft at an axial range where the wall cut portion 53C exists. In the free state of the clip 11, the wall cut portion 53C has a constant width as illustrated in (a) of FIG. 13, or has a width having a portion gradually widened in the direction axially apart from the seat 25 as illustrated in FIGS. 9 and 10. When inserting the clip 11 into or removing the clip 11 from the clip fixing aperture 93, the engagement hooks 31 are elastically deformed to approach each other, so that the opposite rims of the wall cut portion 53C in a width direction of the wall cut portion 53C are elastically deformed to approach each other but not to be brought into contact with each other.

Regarding the technical advantages, since the deformation promoting portion 53 is constructed of the wall cut portion 53C and the wall cut portion 53C extends to the tip end of the shaft 21 to open to the outside, the shaft 21 can be easily deformed at a range of the shaft where the wall cut portion 53C is provided. Accordingly, the force of inserting the shaft 21 into and removing the shaft 21 from the clip fixing aperture 93 is smaller than (and is decreased to, for example, about ⅓-¼ of) the force of inserting and removing of the comparison clip 93 having no deformation promoting portion 53. As a result, in the clip 11 and the pillar garnish fixing structure 1 using the clip 11, the features of installing the clip 11 and the pillar garnish 81 to the inner panel 91*a* of the pillar become good.

The invention claimed is:

1. A clip made from a resin having an elasticity and comprising:
   a seat;
   a hollow shaft extending away from the seat and having an interior space opening to an outside at an opposite seat-side end of the shaft; and
   a pair of engagement hooks opposing each other, each of the pair of engagement hooks being connected to the shaft at a hook connecting portion located at an opposite seat-side end of the engagement hook, being separated from the shaft and the seat by a slit except for the hook connecting portion, and extending from the hook connecting portion toward the seat, wherein
   a distance between outside surfaces of the pair of engagement hooks at the hook connecting portions, located at the same axial position as an opposite seat-side end of the slit, in a free state of the clip is larger than a diameter of a clip fixing aperture of a body,
   a deformation promoting portion, for promoting the hook connecting portion and a hook root portion connected to the hook connecting portion to be deformed in a direction toward a center axis line of the clip when the shaft is inserted into the clip fixing aperture formed at the body, is formed at each of a pair of shaft wall portions opposing each other in a diametrical direction perpendicular to a direction in which the pair of engagement hooks are opposed, the deformation promoting portion being constructed of at least one of an elongated aperture and a wall thickness decreased portion, and
   the deformation promoting portion extends in an axial direction of the shaft and in opposite directions away from a position of the shaft corresponding to the hook connecting portion in the axial direction of the shaft.

2. The clip according to claim 1, wherein
   each of the pair of engagement hooks includes a protrusion protruding further in a direction away from the center axis line of the clip than an outer surface of the shaft when each of the pair of engagement hooks is in a free state,
   the protrusion includes an inclined surface extending in a direction from the hook connecting portion toward a seat-side end of each of the pair of engagement hooks and away from the center axis line of the clip, at least at a portion of the protrusion in a direction along the center axis line of the clip, and an inclination-starting point of the inclined surface is located at a position spaced further from the seat than the hook connecting portion, whereby an outside surface of each of the pair of engagement hooks protrudes more outward than the outer surface of the shaft in a radial direction of the shaft at an axial shaft position corresponding to the hook connecting portion in the axial direction of the shaft.

3. The clip according to claim 1, wherein each engagement hook has a hypothetical rotational deformation center (Rc) and the hypothetical rotational deformation center (Rc) is located at a position further from the seat than the hook connecting portion.

4. The clip according to claim 3, wherein the hypothetical rotational deformation center (Rc) is located at or in a vicinity of the opposite seat-side end of the shaft.

5. The clip according to claim 1, wherein the clip includes an engagement releasing portion connected to a seat-side end of each of the pair of engagement hooks and extending in a direction away from the center axis line of the clip.

6. The clip according to claim 1, wherein the clip is a tether clip for fixing a pillar garnish to a pillar.

7. A pillar garnish fixing structure including the pillar garnish to be fixed to the pillar using the clip according to claim 6.

* * * * *

UNITED STATES PATENT AND TRADEMARK OFFICE
CERTIFICATE OF CORRECTION

Page 1 of 1

PATENT NO. : 9,751,489 B2
APPLICATION NO. : 15/038909
DATED : September 5, 2017
INVENTOR(S) : Kazuhito Yamamoto It is certified that error appears in the above-identified patent and that said Letters Patent is hereby corrected as shown below:

On the Title Page

Item (73):
Change "Toyota (KR)" to --Toyota (JP)--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*